US012644619B2

(12) United States Patent
Jarral et al.

(10) Patent No.: US 12,644,619 B2
(45) Date of Patent: Jun. 2, 2026

(54) SMART THERMOSTAT FOR DUCTLESS HVAC UNITS

(71) Applicant: DiversiTech Corporation, Duluth, GA (US)

(72) Inventors: Anees Ahmed Jarral, Islamabad (PK); Waseem Amer, Islamabad (PK); Umair Nawaz Khan, Rawalpindi (PK); Syeda Farwa Batool, Rawalpindi (PK); Aftab Farooqi, Redmond, WA (US)

(73) Assignee: DiversiTech Corporation, Duluth, GA (US)

( * ) Notice: Subject to any disclaimer, the term of this patent is extended or adjusted under 35 U.S.C. 154(b) by 403 days.

(21) Appl. No.: 18/501,195

(22) Filed: Nov. 3, 2023

(65) Prior Publication Data

US 2024/0068690 A1 Feb. 29, 2024

Related U.S. Application Data

(63) Continuation-in-part of application No. 18/193,576, filed on Mar. 30, 2023, and a continuation of application No. 17/512,622, filed on Oct. 27, 2021, now Pat. No. 11,802,709, said application No. 18/193,576 is a continuation-in-part of application
(Continued)

(51) Int. Cl.

| | |
|---|---|
| *F24F 11/56* | (2018.01) |
| *F24F 11/58* | (2018.01) |
| *F24F 11/63* | (2018.01) |
| *G05B 19/042* | (2006.01) |
| *F24F 110/10* | (2018.01) |
| *F24F 110/20* | (2018.01) |

(52) U.S. Cl.
CPC .............. *F24F 11/56* (2018.01); *F24F 11/58* (2018.01); *F24F 11/63* (2018.01); *G05B 19/042* (2013.01); *F24F 2110/10* (2018.01); *F24F 2110/20* (2018.01); *G05B 2219/2614* (2013.01)

(58) Field of Classification Search
CPC .. F24F 11/56; F24F 11/58; F24F 11/63; F24F 2110/10; F24F 2110/20; F24F 11/64; F24F 11/30; G05B 19/042; G05B 2219/2614; G05B 15/02; G08C 17/02
See application file for complete search history.

(56) References Cited

U.S. PATENT DOCUMENTS

| | | | |
|---|---|---|---|
| 2005/0270151 A1 | 12/2005 | Winick | |
| 2015/0100163 A1* | 4/2015 | Allmaras | G08C 17/02 |
| | | | 700/276 |
| 2018/0147913 A1 | 5/2018 | Bergin | |

(Continued)

*Primary Examiner* — Alicia M. Choi
(74) *Attorney, Agent, or Firm* — Dentons US LLP

(57) ABSTRACT

A system and method for intelligent operation and control of ductless HVAC devices in a manner similar to existing intelligent operation and control of central HVAC systems. In an embodiment, the system and method include using a smart thermostat to separately monitor the room temperature of a room in which a ductless HVAC device is installed, wherein the smart thermostat overrides the standard operation of the HVAC device by setting and re-setting the target temperature of the ductless HVAC device to force it to operate according to settings and algorithms of the smart thermostat which mimic the smart controls available on central HVAC systems.

16 Claims, 16 Drawing Sheets

Smart Module - for converting an IR remote control to a smart thermostat for ductless air conditioners

Related U.S. Application Data

No. 17/512,629, filed on Oct. 27, 2021, now Pat. No. 11,821,643.

(60) Provisional application No. 63/483,221, filed on Feb. 3, 2023.

(56) References Cited

U.S. PATENT DOCUMENTS

| | | | | |
|---|---|---|---|---|
| 2019/0141179 A1 | 5/2019 | Dushane | | |
| 2019/0234676 A1* | 8/2019 | Walser | ................. | F25D 21/006 |
| 2019/0316799 A1 | 10/2019 | Bharatia | | |
| 2019/0331380 A1* | 10/2019 | Seiler | ...................... | F25B 39/04 |
| 2020/0005625 A1* | 1/2020 | Conner | ................. | G08B 29/02 |
| 2020/0182501 A1 | 6/2020 | Malcolm | | |
| 2020/0256573 A1* | 8/2020 | Zhuo | ........................ | F24F 11/56 |
| 2023/0272937 A1* | 8/2023 | Puranen | .............. | G05B 19/042 |
| | | | | 700/276 |

* cited by examiner

101

100a

| CPU 110 | RAM 120 |
| Non-Volatile Storage 130 | Wireless Radio 140 |
| I/O Ports 150 | Sensor(s) 160 |

Smart HVAC Control Module 100

Smart Module - for converting an IR remote control to a smart thermostat for ductless air conditioners

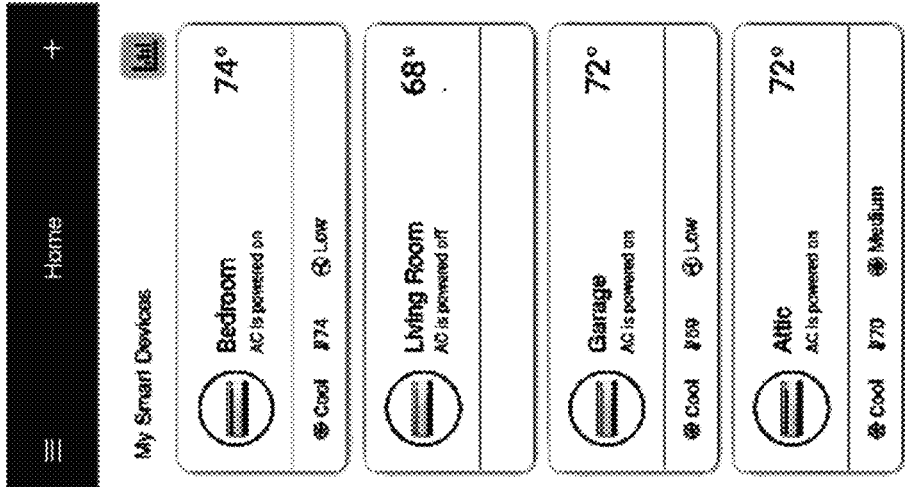
700
Fig. 7

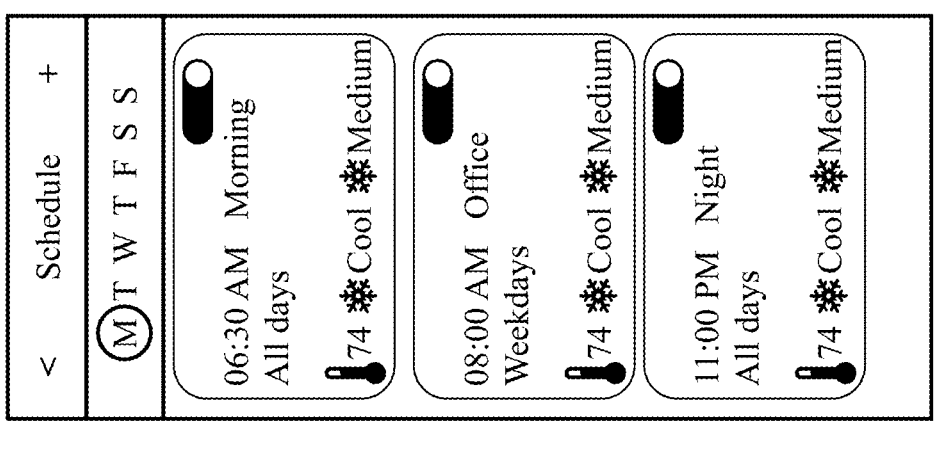
820
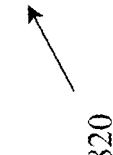
810
Fig. 8

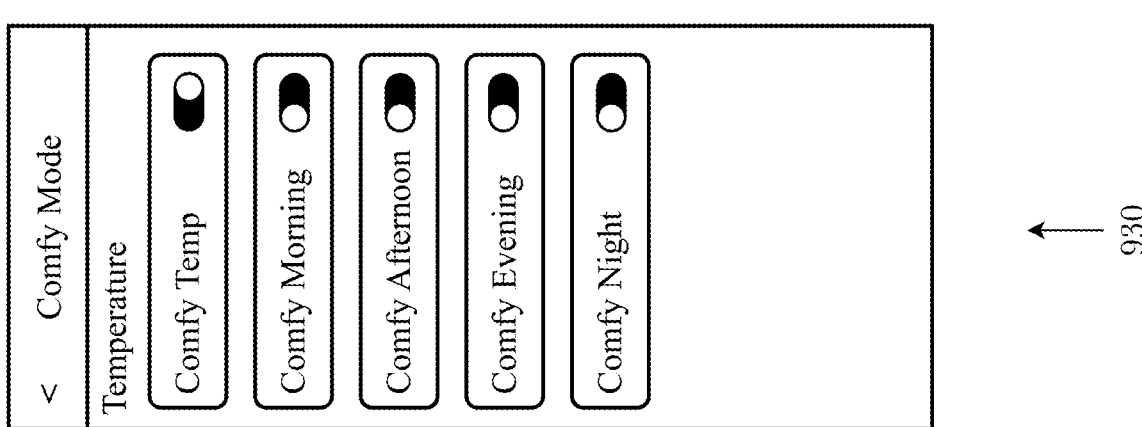

Comfy Mode

< Comfy Mode

Temperature

Comfy Temp

Comfy Morning

Comfy Afternoon

Comfy Evening

Comfy Night

930

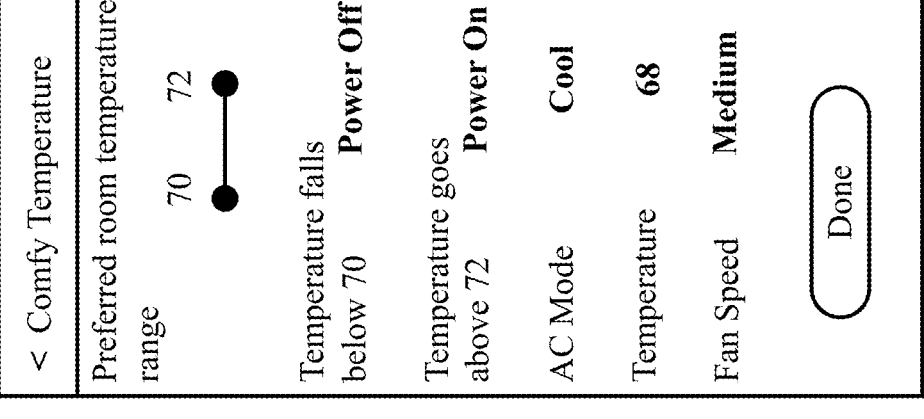

< Comfy Temperature

Preferred room temperature range 70    72

70                    72

Temperature falls
below 70        Power Off

Temperature goes
above 72        Power On

AC Mode        Cool

Temperature    68

Fan Speed      Medium

Done

920

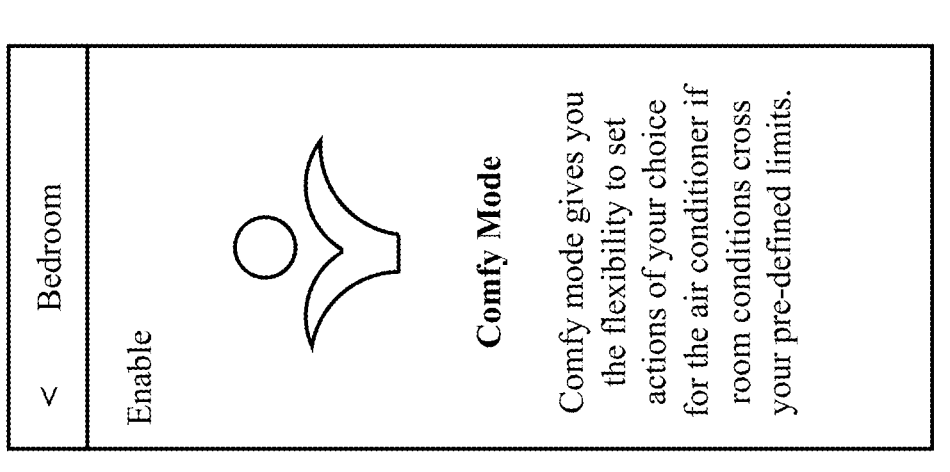

< Bedroom

Enable

Comfy Mode

Comfy mode gives you
the flexibility to set
actions of your choice
for the air conditioner if
room conditions cross
your pre-defined limits.

Exemplary Ductless HVAC System Operation with
Oscillation Dampening & Duty Cycling Optimization

Fig. 12

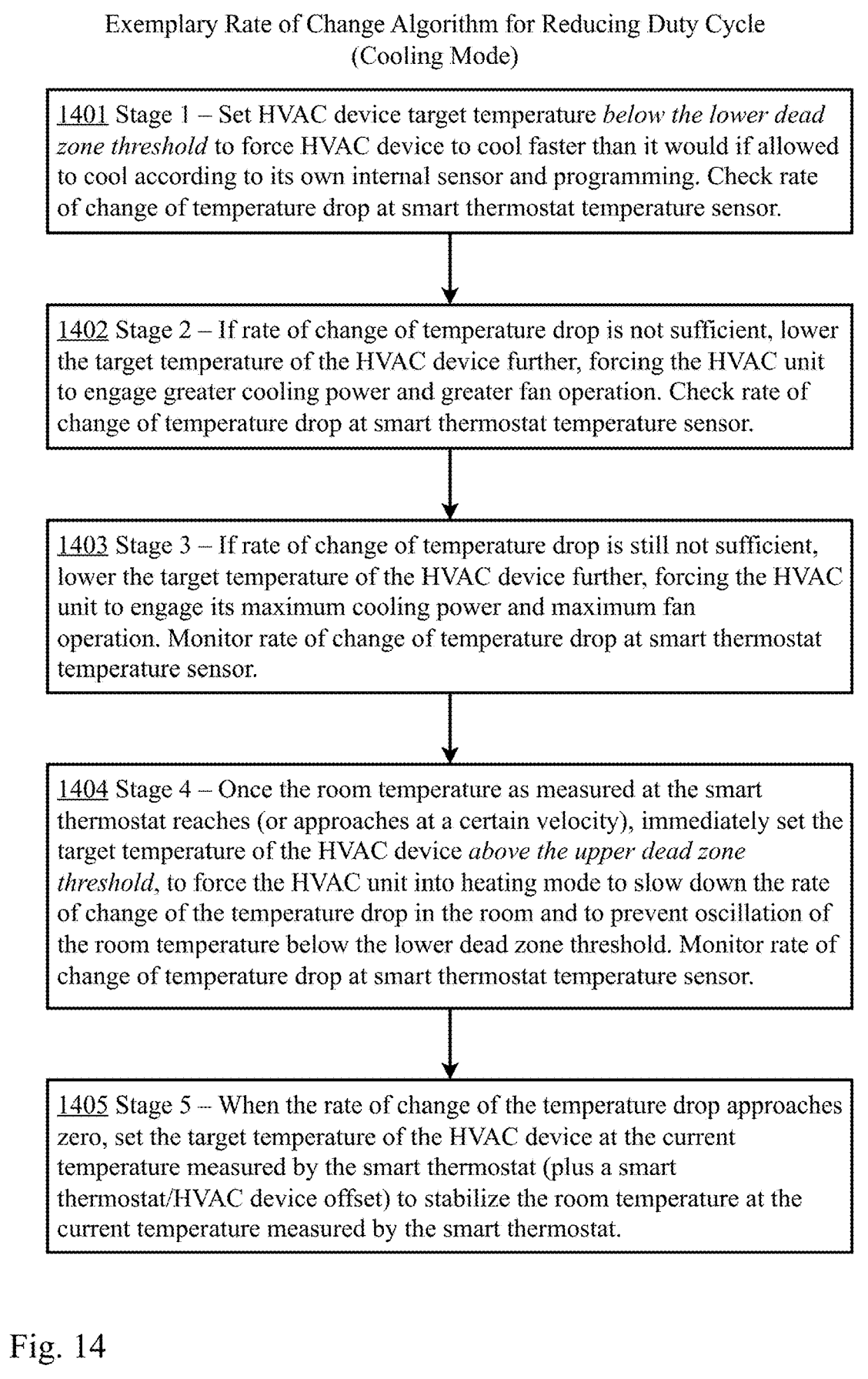

Exemplary Rate of Change Algorithm for Reducing Duty Cycle
(Cooling Mode)

1401 Stage 1 – Set HVAC device target temperature *below the lower dead zone threshold* to force HVAC device to cool faster than it would if allowed to cool according to its own internal sensor and programming. Check rate of change of temperature drop at smart thermostat temperature sensor.

1402 Stage 2 – If rate of change of temperature drop is not sufficient, lower the target temperature of the HVAC device further, forcing the HVAC unit to engage greater cooling power and greater fan operation. Check rate of change of temperature drop at smart thermostat temperature sensor.

1403 Stage 3 – If rate of change of temperature drop is still not sufficient, lower the target temperature of the HVAC device further, forcing the HVAC unit to engage its maximum cooling power and maximum fan operation. Monitor rate of change of temperature drop at smart thermostat temperature sensor.

1404 Stage 4 – Once the room temperature as measured at the smart thermostat reaches (or approaches at a certain velocity), immediately set the target temperature of the HVAC device *above the upper dead zone threshold*, to force the HVAC unit into heating mode to slow down the rate of change of the temperature drop in the room and to prevent oscillation of the room temperature below the lower dead zone threshold. Monitor rate of change of temperature drop at smart thermostat temperature sensor.

1405 Stage 5 – When the rate of change of the temperature drop approaches zero, set the target temperature of the HVAC device at the current temperature measured by the smart thermostat (plus a smart thermostat/HVAC device offset) to stabilize the room temperature at the current temperature measured by the smart thermostat.

Fig. 14

SMART THERMOSTAT FOR DUCTLESS HVAC UNITS

CROSS-REFERENCE TO RELATED PATENT APPLICATIONS

This patent application is a (1) Continuation in Part of U.S. Non-Provisional patent application Ser. No. 18/193,576 filed 30 Mar. 2023; which is a Continuation in Part of U.S. Non-Provisional patent application Ser. No. 17/512,629 filed 27 Oct. 2021, now U.S. Pat. No. 11,821,643 issued 21 Nov. 2023; which is a Continuation of US Non-Provisional patent application Ser. No. 17/512,622 filed 27 Oct. 2021, now U.S. Pat. No. 11,802,709 issued 31 Oct. 2023; and (2) claims a benefit of priority to U.S. Provisional Patent Application 63/483,221 filed 3 Feb. 2023; each of which is incorporated by reference herein for all purposes.

BACKGROUND

Field of the Art

The disclosure relates to the field of computer control systems, and more particularly to the field of wireless control of ductless HVAC systems.

Discussion of the State of the Art

Consumers in today's world often have multiple household devices and appliances that are controlled via primitive infrared (IR) remote controllers. Three common examples of such devices include ductless heating, ventilation, and air conditioning (HVAC) appliances (mini split units, window units, and portable units), flat-screen televisions, and media players such as digital video disc (DVD) and Blu-ray players. These devices are typically installed or used at multiple locations in homes and offices, but are individually controlled by a conventional infrared (IR) remote control provided with each unit by the manufacturer. The IR remote controls relay user commands to the appliances for appropriate actions. The existing IR remote controls for these devices are very primitive, allowing only for immediate setting of simple controls such as, in the case of HVAC appliances, temperature, fan speed, heat/cool, etc. They are not capable of executing more complicated functions such as scheduled usage, smart triggers and thermostats, setting of temperature ranges, intelligent/predictive operation to optimize energy efficient usage, guiding the users about usage history of their air conditioners for energy efficient lifestyles, or similar smart functions.

Further, they have no means for coordinating with other units. Flat-screen televisions and media players cannot, for example, be instructed to display the same movie on all devices throughout the home. In the case of HVAC appliances, unlike ducted HVAC systems which heat and/or cool multiple rooms and for which heating and cooling zones can be established and controlled from a central location, ductless HVAC systems are installed in a single room and provide heating or cooling to that room only. When multiple ductless HVAC system are installed in different rooms, the user must manually change the settings for each unit in each room separately using the primitive controls of each unit's IR controller. No centralized coordination or control of multiple IR-controlled devices is available.

What is needed is a system and method for intelligent operation and control of primitive IR-controlled devices and appliances, and preferably a system and method which requires little or no modification of existing devices and appliances or their controllers.

SUMMARY

Accordingly, the inventor has conceived and reduced to practice, a system and method for intelligent operation and control of ductless HVAC devices in a manner similar to existing intelligent operation and control of central HVAC systems. In an embodiment, the system and method comprise using a smart thermostat to separately monitor the room temperature of a room in which a ductless HVAC device is installed, wherein the smart thermostat overrides the standard operation of the HVAC device by setting and re-setting the target temperature of the ductless HVAC device to force it to operate according to settings and algorithms of the smart thermostat which mimic the smart controls available on central HVAC systems.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 7 is a screenshot of an application for a mobile device showing management of multiple ductless HVAC appliances through smart HVAC control modules.

FIG. 8 is a set of screenshots of an application for a mobile device showing scheduling of operation of ductless HVAC appliances through smart HVAC control modules.

FIG. 9 is a set of screenshots of an application for a mobile device showing automated management of ductless HVAC appliances through smart HVAC control modules.

FIG. 12 is a diagram showing exemplary operation of a ductless HVAC device as operated by a smart thermostat as described herein with oscillation damping and duty cycle optimization.

FIG. 14 is a flow diagram an exemplary algorithm for damping oscillation and reducing the duty cycle of a ductless HVAC device by setting and re-setting of the target temperature of the HVAC device based on rate of room temperature change.

DETAILED DESCRIPTION

Figure 1:
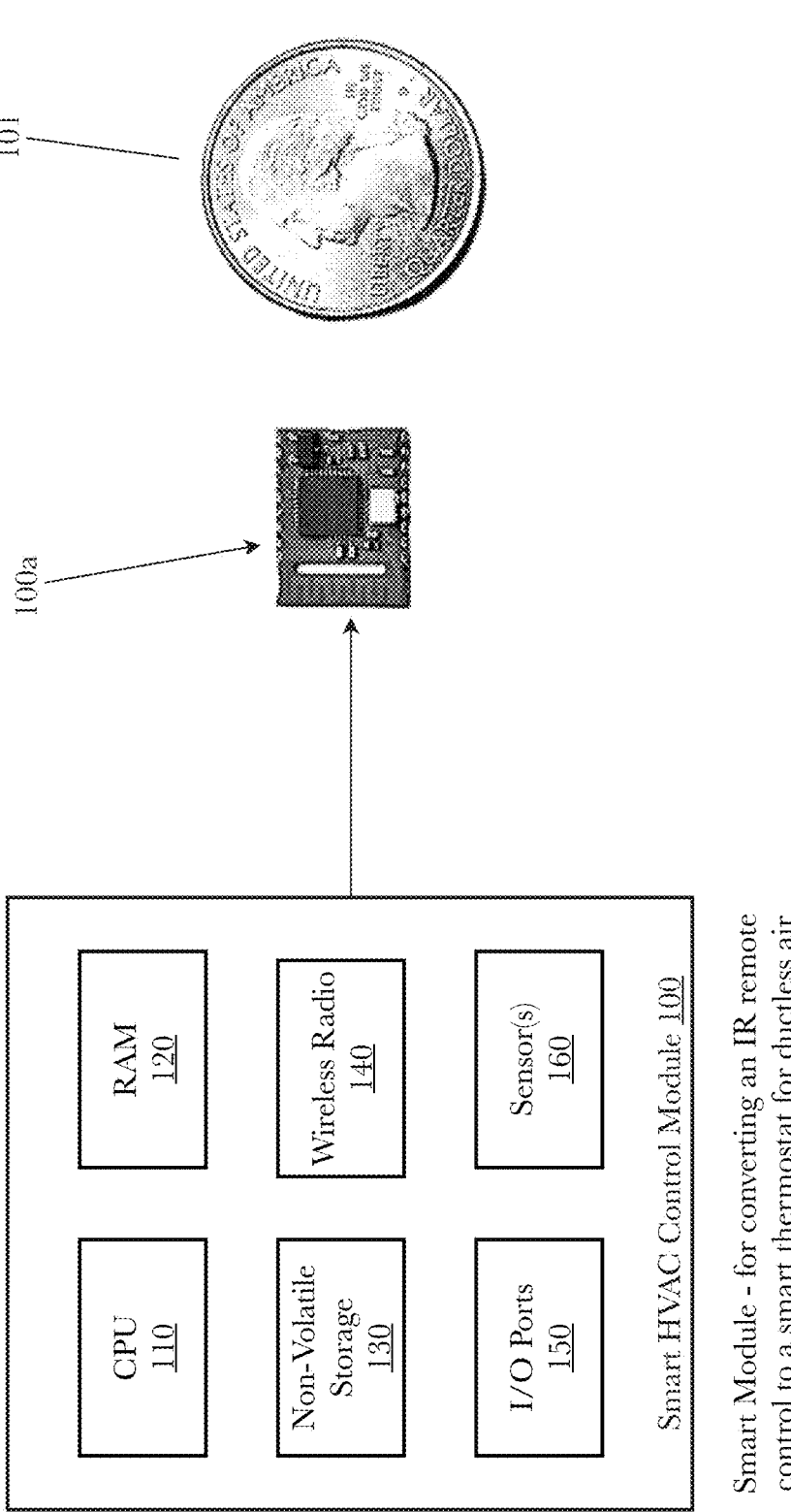
FIG. 1 is a block diagram illustrating a hardware architecture for a smart HVAC control module.

The inventor has conceived, and reduced to practice, a system and method for intelligent operation and control of ductless HVAC devices in a manner similar to existing intelligent operation and control of central HVAC systems. In an embodiment, the system and method comprise using a smart thermostat to separately monitor the room temperature of a room in which a ductless HVAC device is installed, wherein the smart thermostat overrides the standard operation of the HVAC device by setting and re-setting the target temperature of the ductless HVAC device to force it to operate according to settings and algorithms of the smart thermostat which mimic the smart controls available on central HVAC systems.

Conventional ductless HVAC systems are not capable of smart, intelligent, or predictive operation. Conventional ductless HVAC devices receive basic settings from an IR remote controller (e.g., a temperature set point, also known as a target temperature) and the operation of the ductless HVAC device is controlled by basic internal programming which operates the compressor and fan according to pre-set speeds based on levels of deviation of the room temperature from the target temperature. Further, as the temperature sensor is internal to the ductless HVAC device and as most ductless HVAC devices are installed close to the ceiling, the room temperature as measured by the internal temperature sensor can vary by several degrees from the temperature where people are standing or sitting.

Other obstacles to smart operation of ductless HVAC devices are presented by the compressor type installed in each HVAC device. A major disadvantage of ductless HVAC devices with conventional-type compressors is that they are either fully on or fully off. This results in a fixed level of cooling or heating based entirely on the current room temperature versus the target temperature. This on/off functionality is inefficient and wastes energy. An improvement over conventional-type compressors is the inverter-type compressor, which has variable speed operation. However, the disadvantage of inverter-type compressors is that they are always on and never fully shut off while the ductless HVAC device is in operation. There is no hybrid type compressor that allows for both variable operation and on/off operation, depending on circumstances.

The smart thermostat system and method as herein described overcomes these obstacles by acting as an external controller with algorithms which overrides the standard operation of the HVAC device by setting and re-setting the target temperature of the ductless HVAC device to force it to operate according to settings and algorithms of the smart thermostat which mimic the smart controls available on central HVAC systems. It does this by taking advantage of the basic internal programming which operates the compressor and fan according to pre-set speeds based on levels of deviation of the room temperature from the target temperature by setting the target temperature above or below the intended room temperature to cause the ductless HVAC device to operate as though there is a greater or lesser differential between the target temperature and room temperature than actually exists.

It is important to note that the temperatures measured by the temperature sensors in the ductless HVAC device 1010 and smart thermostat 1110 are likely to differ due to the difference in locations of these devices within a given room. Ductless HVAC devices are typically placed high on a wall, near the ceiling, where the room temperature will normally be higher because hot air rises. Smart thermostats, on the other hand, will typically be placed at table-top height or on a wall at about chest height for a person, as those locations are where persons in the room are more likely to be and where the temperature matters more. Thus, the temperature sensor on ductless HVAC devices will typically register a higher temperature than the temperature sensor on the smart thermostat. As ductless HVAC devices only receive IR signals and do not transmit them, the communication between the ductless HVAC device and the smart thermostat is uni-directional (i.e., transmissions from the smart thermostat are received by the ductless HVAC device). Consequently, the smart thermostat does not directly know the temperature reading of the temperature sensor in the ductless HVAC device. However, the smart thermostat can indirectly discern the temperature difference by monitoring the room temperature using its own sensor and comparing changes in the room temperature against changes it makes in the target temperature of the ductless HVAC device. For example, if the smart thermostat 1110 reads 70 F from its own temperature sensor, sets a target temperature of 70 F on the ductless HVAC device 1010, and the room temperature lowers by 2 F on the smart thermostat's temperature sensor, the smart thermostat 1110 may assume that the temperature sensor of the ductless HVAC device 1010 is reading 2 F higher than its own, or 72 F. More complicated calculations and predictions of this temperature differential can be made, but the simplified example above illustrates the concept. While this differential will often exist, for clarity and consistency the examples herein will largely ignore this differential. In practice, the smart thermostat will change the target temperature of the ductless HVAC device with an offset to account for this difference. For example, if the smart thermostat 1110 reads 70 F and it has determined that the ductless HVAC device reads at 72 F under the same room conditions, the smart thermostat's target temperature instructions to the ductless HVAC device will add 2 F to the smart thermostat's desired temperature.

It is further important to note that while many of the examples herein are explained in terms of cooling, the same principles may be applied to heating. Where a ductless HVAC system has a heat pump and is capable of both cooling and heating, the same principles may be applied to both cooling and heating in the same ductless HVAC device.

While the examples herein discuss embodiments associated with HVAC appliances, the invention is not limited to HVAC appliances, and includes any device or appliance controlled by a primitive IR controller, some common and non-limiting examples of which are ductless heating, ventilation, and air conditioning (HVAC) appliances (mini split units, window units, and portable units), flat-screen televisions, media players such as digital video disc (DVD) and Blu-ray players, and children's toys. For example, the algorithms described herein for keeping temperatures within a temperature range can be applied to keeping a brightness of a television within a brightness range, or to keeping a sound volume of a media player within a sound volume range, or to operating children's toys within a certain range of functionality or within a certain physical space.

In various embodiments, the technology includes a smart module that can be embedded into conventional IR remote controls of ductless HVAC appliances to convert the IR remote controls to smart remote controllers connected via a custom application for smartphone, mobile phone, or other computer, and optionally to a custom cloud platform which can provide additional functionality and remote operation via the Internet. Using the system, users can control HVAC appliances, generate analytics, schedule automatic operation, and perform smart learning operations.

In one embodiment, a clip-on smart module unit is attached to one or more primitive IR controllers. The smart module is configured to receive and pass through any IR controls received from operation of the IR controller to its associated HVAC unit, while simultaneously transmitting notification of the controls received to a mobile app via WiFi, Bluetooth, or another wireless communication protocol. The smart module is also configured to receive controls wirelessly from the mobile app, convert those controls into IR signals, and transmit those IR signals to a particular HVAC unit as if the IR controller for that HVAC unit had itself generated them. In this way, a plurality of ductless HVAC systems can be monitored and controlled remotely by a mobile device that acts as a centralized, intelligent control system for the HVAC units. In some embodiments, the system and method further comprising cloud-based functionality, such that a plurality of mobile computing devices (or other computing devices) can access and control any HVAC unit registered to a given account.

In another embodiment, universal IR controllers can be manufactured containing IR signal codes for the ductless HVAC systems of major manufacturers and/or configurable to be able to "learn" IR codes from the IR controller of a given ductless HVAC unit. The universal controller is manufactured with a built-in smart module containing the necessary networking features to interact with an app on a mobile computing device. The operation of the universal IR controller is otherwise similar to that of the clip-on smart module described above.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

DETAILED DESCRIPTION OF THE DRAWING
FIGURES

FIG. 1 is a block diagram illustrating a hardware archi-
tecture for a smart HVAC control module. The smart HVAC
control module of this embodiment is a system constructed
on a PCB board comprising a central processing unit (CPU)
110, random access memory (RAM) 120, non-volatile stor-
age such as a flash storage (based on electrically erasable,
programmable memory (EEPROM) technology) 130, a
wireless communication device (e.g., supporting Bluetooth,
WiFi, or other wireless communication protocols 140, input/
output ports 150, and optionally sensors 160 such as infrared
light sensors. An actual implementation 100a of a smart
HVAC control module 100 is shown in relation to the size
of a U.S. quarter 101. Its small size means that it can easily
be integrated into existing IR remotes for HVAC systems or
into an attachable (e.g., clip-on) device that can be attached
to existing IR remotes without modification.

Software and other operational programming and func-
tionality can be stored in the non-volatile storage 130,
loaded into faster volatile memory such as RAM 120, and
run on the CPU 110. Input/output ports 150 (which may be
"pins" on integrated circuits (ICs) and microcontrollers)
provide connections with other devices and/or systems (e.g.,
in the case of internal integration of the module 100 into an
IR remote, and sensors 160 may be used to provide addi-
tional functionality. As one example, in the case of an
attachable device, an IR sensor may receive an IR signal
from the existing IR remote, and one of the output ports may
be an IR transmitter that outputs an IR signal (which may
simply be a pass-through of the same IR signal) to the
HVAC appliance. In this way, the IR signal from the IR
remote can be intercepted, acted upon by the module, and
re-transmitted to the HVAC appliance, such that the HVAC
appliance operates as though the IR signal had been received
directly from the IR remote.

Figure 2:
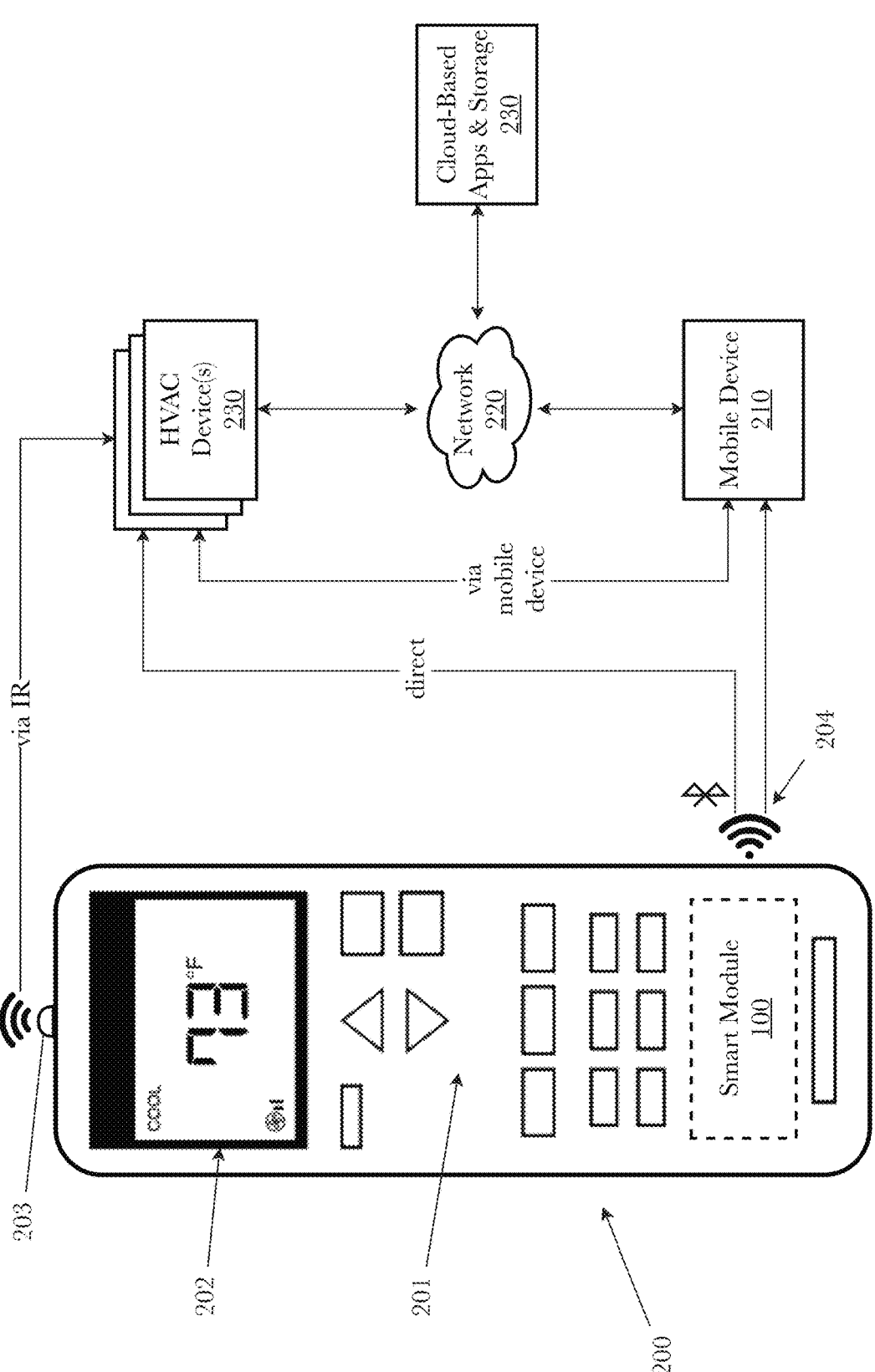
FIG. 2 is a block diagram illustrating an exemplary system architecture for a smart HVAC control system for ductless HVAC appliances.

FIG. 2 is a block diagram illustrating an exemplary
system architecture for a smart HVAC control system for
ductless HVAC appliances. In this embodiment, a smart
HVAC control module 100 is directly integrated into an
otherwise standard infrared (IR) remote controller 200 for
ductless HVAC systems.

A standard IR remote controller 200 is a handheld device
containing buttons 201 for activating various features of the
HVAC appliance, a screen 202 which displays information
about the HVAC appliance such as the current temperature,
whether the device is in heating, cooling, or auto mode, the
current fan speed, etc., and an infrared emitter 203, typically
in the form of a light emitting diode (LED) capable of
emitting infrared light. The reason infrared is used is that it
is not visible to the human eye, so does not appear to project
a beam of light on the wall or appliance (i.e., it is invisible
to the user). Note that, in some models of IR remote
controllers, the screen may be a touchscreen, and the buttons
may be software buttons on the touchscreen. The term
"button" herein refers to both variants. Here, the standard IR
remote controller 200 has either been manufactured with, or
modified to include, a smart module 100, the integrated
smart module 100 being capable through its I/O ports of 150
either of receiving signals related to the operation of the
remote controller's 200 buttons 201, or of receiving signals
from the remote controller 200 directing the operation of the
IR emitter 203, for the purposes of transmitting information
to the mobile device 210. Further, the smart module of this
embodiment is capable of directing the operation of the IR
remote control 200 using its I/O ports 150 (e.g., upon receipt of instructions from the mobile device 210, the smart
module 100 can direct the IR remote control 200 to change
the operation of the HVAC appliance 230 via its IR emitter
203). The smart module of this embodiment is powered by
the batteries of the standard IR remote controller 200.

As the IR remote control 200 is operated, the smart
module 100 receives the one or more signals about the
operation from the IR remote control 200 via its I/O ports
150. The smart module 100 transmits signals detailing the
operation wirelessly 204 (e.g., via Bluetooth) to a mobile
device 210 running an application configured as a central-
ized management application for one or more HVAC appli-
ances 230. The wireless transmission 204 may any wireless
transmission protocol (e.g., Bluetooth, WiFi, etc.) and may
contain information about the operation and/or current state
of the controller (e.g., an identifier for the smart module 100,
what button was pushed on the controller 200, what the
current temperature and mode settings are, etc.). The HVAC
appliances 230 can receive signals in one of four ways:
directly via the IR (i.e., primitive IR control), directly via the
wireless transmission 204 from the smart module 100, via a
wireless transmission from the mobile device, or via a
wireless transmission from a router connected to a network
220. In the latter three cases, the HVAC appliances must be
network-capable (i.e., contain a wireless device and other
appropriate hardware, software, and/or firmware to receive
wireless signals) from the smart module 100, the mobile
phone 210, or a router connected to the network 220.
However, even if the HVAC appliance(s) are not network-
capable, the operation of, and current status of, the HVAC
appliance(s) 230 is still received and tracked by the mobile
device.

The mobile device 210 (which may be any network-
connected computing device, but is assumed in this embodi-
ment to be a smartphone, laptop computer, or tablet com-
puter) acts as a central HVAC management system for any
number of HVAC devices installed at any number of loca-
tions, provided that smart-module-enabled 100 IR remote
control 200 is available for each HVAC appliance to be
managed by the mobile device 210. While only one mobile
device 210 is shown here, any number of mobile devices
may be configured to operate the smart modules 100. While
not shown here, in some configurations, the mobile device(s)
may be connected to the smart modules 100 and/or other
mobile device(s) 210 via a network (which may be a local
network such as via a wireless router, a wide area network
involving multiple routers, the Internet, etc.). As the mobile
device 210 receives wireless transmissions 204 from each IR
remote control 200, the application on the mobile device 100
tracks information about the status of the IR remote control
and the status of its associated HVAC appliance 230 includ-
ing, but not limited to, information such as from which smart
module 100 the transmission was received, which HVAC
appliance 230 is associated with that smart module 100, the
current room temperature sensed by the IR remote control
200, the current temperature setting of the IR remote control
200, the current mode (heat, cool, auto, etc.) of the IR remote
control 200, and the current fan speed setting. The applica-
tion on the mobile device may be configured to display
appropriate information to the user about the status of IR
remote controls 200 and their associated HVAC appliances
230. Further, the application may be used to manage, con-
trol, and/or schedule the operation of HVAC appliances 230
via communication with the smart module 100 of their
associated IR remote controls 200. For example, a user with
HVAC appliances installed upstairs and downstairs in his
home may set the downstairs HVAC appliance to maintain the temperature within a range of 20° C. to 25° C., and the upstairs HVAC appliance to maintain the temperature within a range of 23° C. to 27° C. The mobile device 210 will maintain either continuous or periodic communication with the smart modules 100 associated with the downstairs and upstairs HVAC appliances, directing each smart module 100 to instruct the IR remote control 200 into which it is integrated to change the operation of the HVAC appliance 230 with which the IR remote control 200 is associated via its IR emitter 203.

The centralized management of HVAC appliances 230 may be further enhanced by connecting mobile devices 210 and network-capable HVAC appliances 230 to cloud-based applications and storage 230 via the Internet. This allows remote management of HVAC appliances from any network-enabled computing device anywhere in the world via web browsers, as the management application and storage of information can be located on the cloud-based server 230 without having to be downloaded or installed on a local computer or mobile device.

Figure 3:
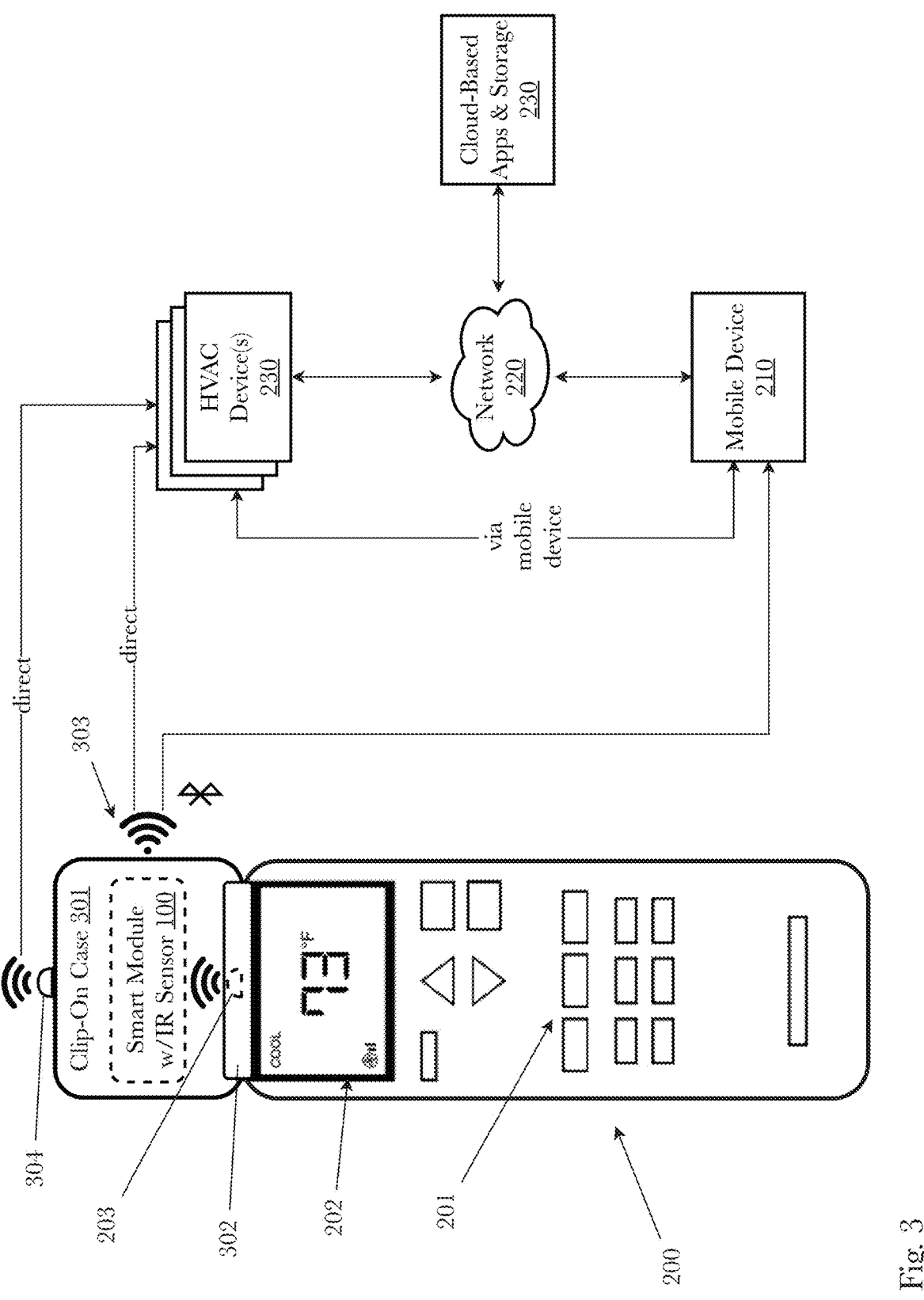
FIG. 3 is a block diagram illustrating an alternate system architecture for a smart HVAC control system for ductless HVAC appliances.

FIG. 3 is a block diagram illustrating an alternate system architecture for a smart HVAC control system for ductless HVAC appliances. In this embodiment, the smart module 100 is not integrated into the IR remote control 200, but is instead located inside a separate device (shown here as a clip-on case) 301 that can be attached to an unmodified IR remote control 200. The smart module of this embodiment is powered by the batteries inside the clip-on case 301.

The attachable separate device 301 is attached by a set of clips 302 or other convenient means of attachment (e.g., a sleeve, compression fitting, strap, tabs, screws, adhesives, hook-and-loop fastener such as Velcro®, etc.) over the IR emitter 203 of the IR remote control 200. In this way, an IR sensor on the smart module 100 can receive an IR signal from the IR emitter 203 intended to control the operation of an HVAC appliance 230. When the IR sensor receives the IR signal from the IR emitter 203, the smart module 100 decodes the IR signal to determine what operation instruction(s) the IR remote control 200 was sending to an HVAC appliance 230. The IR signal is typically in the form of coded pulses of infrared light at particular frequencies, which pulses and frequencies differ between manufacturers. The codes and frequencies and the operations the control can be either looked up or decoded using an IR sensor and an oscilloscope, and using these or other methods can be programmed into the smart module 100.

Upon receipt of the IR signal from the IR emitter, the smart module 100 decodes the signal and wirelessly transmits 303 information about the IR signal to a mobile device (or network-enabled HVAC appliance) for use in the mobile device's 210 HVAC management application. The smart module 100 may also be configured to simultaneously emit a copy of the IR signal via its own IR emitter 304, either as a direct pass through of, or regeneration of, the original IR signal from the IR emitter 203 of the IR remote controller 200.

In all other respects, the system of this embodiment operates similarly to the system of the embodiment described above in relation to FIG. 2.

Figure 4:
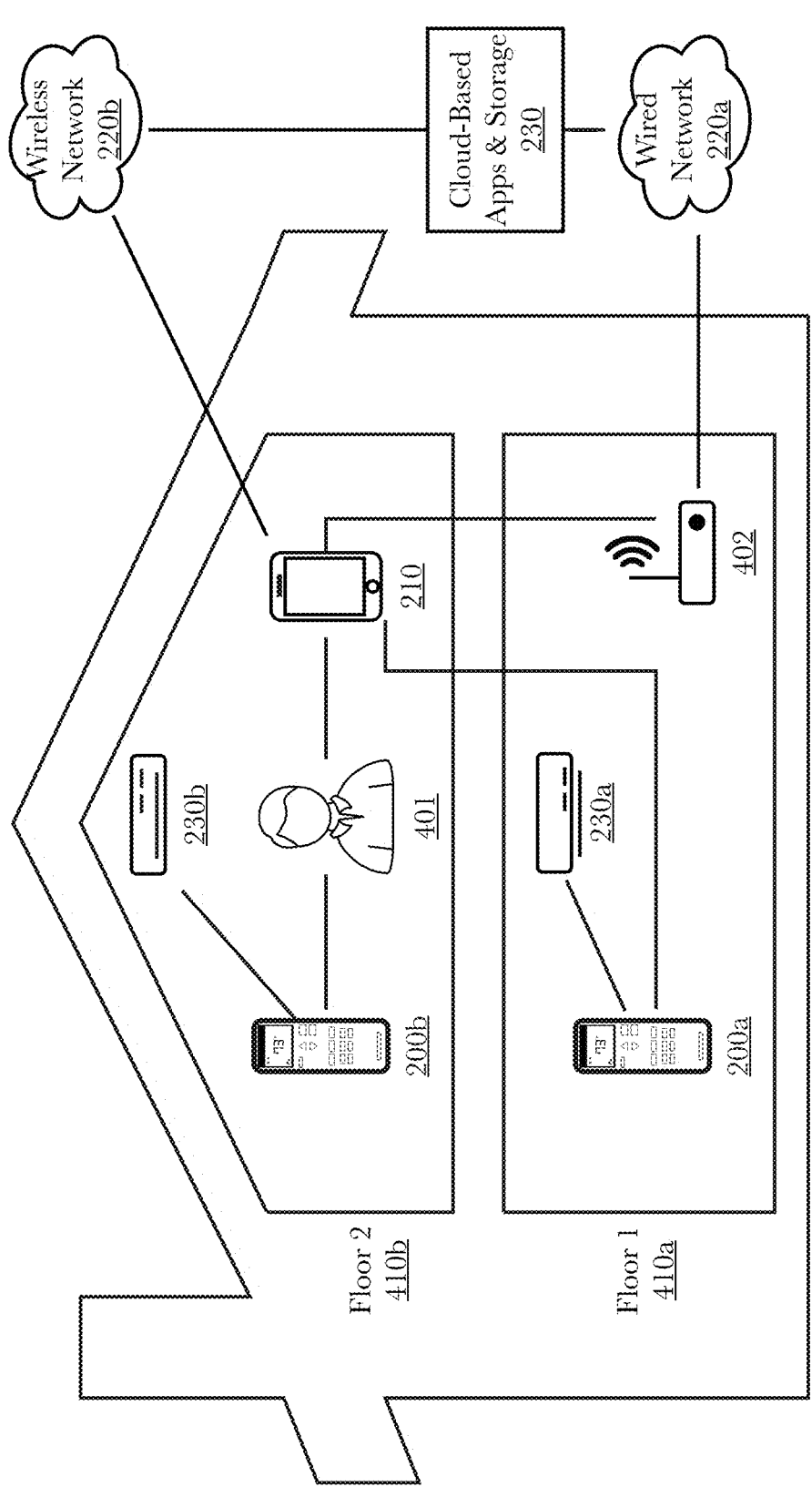
FIG. 4 is a block diagram illustrating an exemplary application of a smart HVAC control system for ductless HVAC appliances.

FIG. 4 is a block diagram illustrating an exemplary application of a smart HVAC control system for ductless HVAC appliances. Here, a homeowner 401 wishes to control the downstairs floor 1 410a and upstairs floor 2 410b of his home as different zones. Floor 1 410a is the downstairs zone containing a first ductless HVAC appliance 230a with its associated first IR remote control 200a. Floor 1 410a is also where the home's wireless router 420 is installed with a wired connection to a network 220a through a cable modem, a digital subscriber line (DSL) connection, or a fiber optic connection to the home. Floor 2 410b is the upstairs zone containing a second ductless HVAC appliance 230b with its associated second IR remote control 200b. In this example, the homeowner 401 is currently located on floor 2 410b and has his mobile device (in this case a smartphone) at hand. The homeowner may use the second IR remote control 200b to directly set the desired room temperature setting for the second HVAC appliance 230b, but cannot directly set the desired room temperature setting for the first HVAC appliance 230a, which is located downstairs. However, the homeowner can use his mobile device 210 to remotely set the desired room temperature setting for the second HVAC appliance 230b. whether the homeowner uses the IR remote controllers 200a,b or the mobile device 210 to change the settings of the HVAC appliances, the application on the mobile device receives wireless communications from smart modules 100 integrated into or attached to the IR remote controllers 200a,b, this keeping track of the status of all monitored HVAC appliances and allowing for centralized management thereof.

Depending on the configuration, the mobile device 210 may establish wireless connections directly with the IR remote controllers 200a,b, as shown in this diagram, or may establish wireless connections through the home's wireless router 402 to which the IR remote controllers 200a,b are connected (not shown in this diagram). In configurations where the HVAC appliances 230a,b are network-capable (e.g., where a smart HVAC control module 100 is installed in, or attached to, the HVAC appliance), the HVAC appliances may be controlled directly by the mobile device 210 or other computer through a network connection without having to route the controls through the IR remote controllers 200a,b. Further, the mobile device and/or smart modules 100 of the IR remote controllers 200a,b may be connected to a cloud-based management system 230 either via a wireless connection 220b such as a cellular data service or via a wireless router with a wired connection 220a to a network such as through a cable modem, a digital subscriber line (DSL) connection, or a fiber optic connection to the home. In configurations with cloud-based management system 230, the HVAC appliances may be controlled remotely from anywhere in the world using any computing device running a web browser and connected to the Internet.

Figure 5:
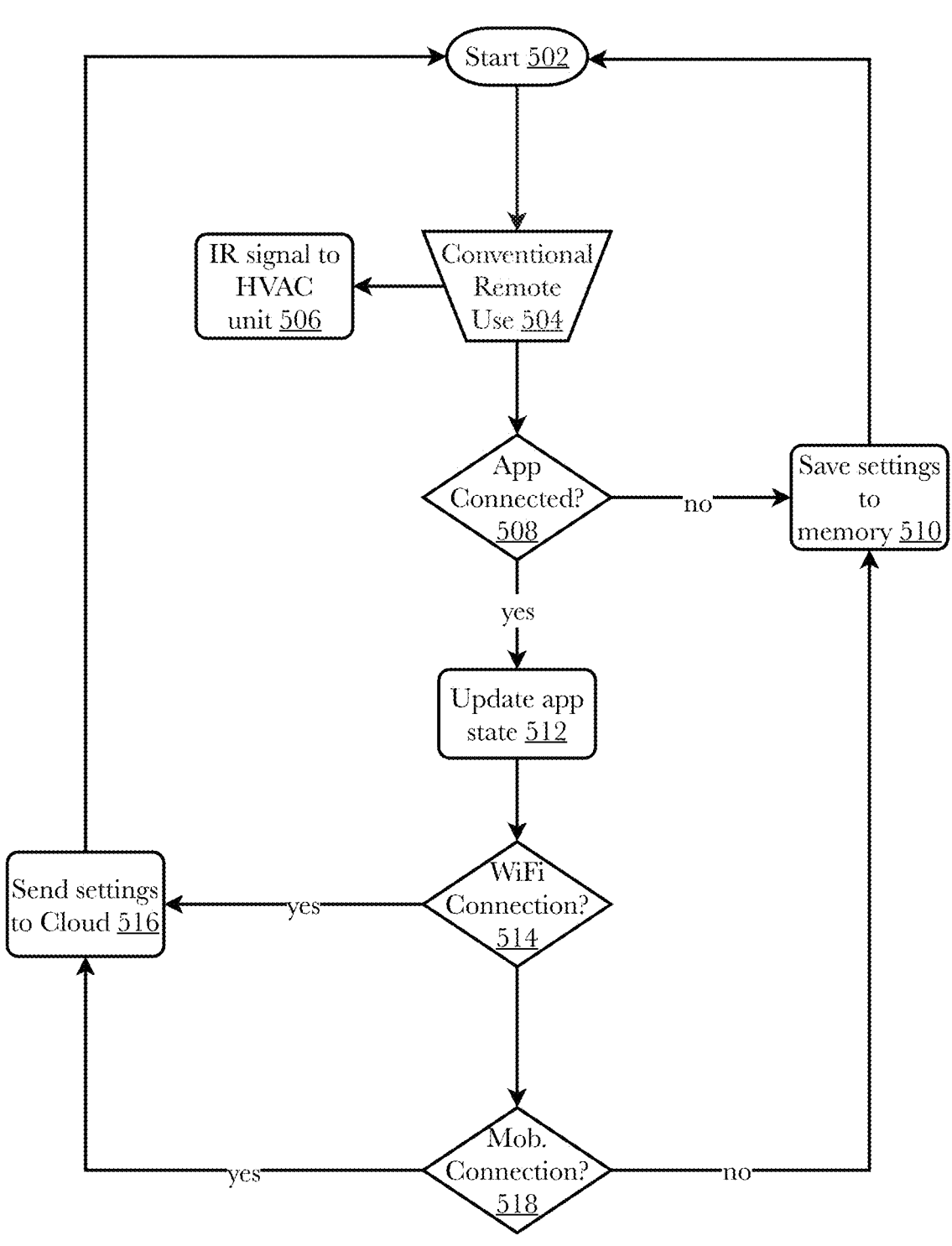
FIG. 5 is a flow diagram illustrating exemplary operation of a smart HVAC control system when a conventional IR remote is used to operate an HVAC appliance.

FIG. 5 is a flow diagram illustrating exemplary operation of a smart HVAC control system when a conventional IR remote is used to operate an HVAC appliance. At the start of the process 502 the HVAC appliance is ready to receive a control signal. When a user operates the conventional IR remote controller 504, the IR remote controller sends an IR signal 506 to the HVAC appliance to change its operation. The smart module of the IR remote controller checks to see whether it is connected to an application on a mobile device 508. If it is not so connected, the smart module saves the changed settings to it memory (either volatile or non-volatile), and the process returns to the start 502. If the smart module is connected to a mobile device, the smart module transmits information about the changed settings to the application of the mobile device 512. Depending on the configuration, the mobile device then checks to see whether it has a network connection to a cloud-based management system via a wireless router (typically via WiFi 514). If it has a network connection through a router, the mobile device sends the changed settings to the cloud-based management system for logging 516, and the process returns to the start 502. If the mobile device does not have a network connection 518, the mobile device checks to see if it has a connection to the cloud-based management server via a mobile (i.e., cellular) network. If so, it sends the changed settings to the cloud-based management system for logging 516. If not, the application of the mobile device saves the settings to the mobile device's memory 510, and the process returns to the start 502.

Figure 6:
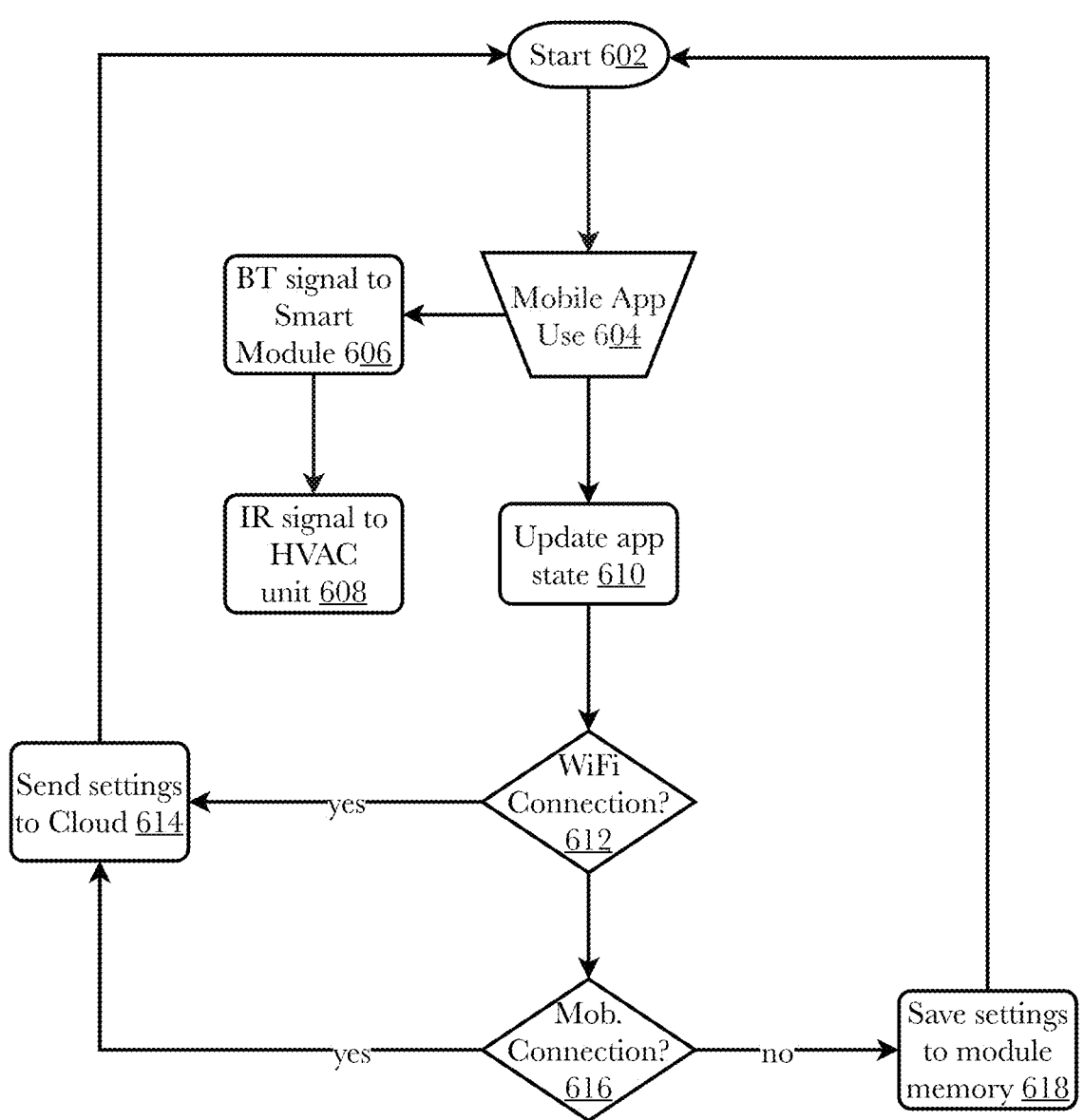
FIG. 6 is a flow diagram illustrating exemplary operation of a smart HVAC control system when an app on a mobile device is used to operate an HVAC appliance.

FIG. 6 is a flow diagram illustrating exemplary operation of a smart HVAC control system when an app on a mobile device is used to operate an HVAC appliance. At the start of the process 602 the HVAC appliance is ready to receive a control signal. When a user operates an application on a mobile device 604, the mobile device sends a wireless signal (e.g., via Bluetooth) 606 to the smart module which, in turn, sends an IR signal to the HVAC appliance to change its operation 608. The application on the mobile device updates its status to reflect the changes 610. The mobile device then checks to see whether it has a network connection to a cloud-based management system via a wireless router (typically via WiFi) 612. If it has a network connection through a router, the mobile device sends the changed settings to the cloud-based management system for logging 614, and the process returns to the start 602. If the mobile device does not have a network connection via a router, the mobile device checks to see if it has a connection to the cloud-based management server via a mobile (i.e., cellular) network 616. If so, it sends the changed settings to the cloud-based management system for logging 614. If not, the application of the mobile device saves the settings to the mobile device's memory 618, and the process returns to the start 602.

FIG. 7 is a screenshot of an application for a mobile device showing management of multiple ductless HVAC appliances through smart HVAC control modules. The screenshot 700 shows four HVAC appliances in four different locations throughout a home, each with its individual settings shown. Selecting one of the HVAC appliances (e.g., by tapping the screen on the mobile device) opens up a screen allowing for changing of the settings of that HVAC appliance using the methods described herein. In this way, the mobile device (or a corresponding cloud-based management application) acts as a central management device for all connected HVAC appliances.

FIG. 8 is a set of screenshots of an application for a mobile device showing scheduling of operation of ductless HVAC appliances through smart HVAC control modules. The first screenshot 810 shows a scheduling interface for a connected HVAC appliance allowing for setting of days of the week, times of the day, states, modes, temperatures, fan speeds, and certain automated management functions with pre-defined or user-definable operations such as a "comfy state," and "comfy trigger," as will be described below. The second screenshot 820 shows a series of scheduling states that have been programmed using the interface, a morning schedule having a first group of settings, an office (daytime) schedule having a second group of settings, and a night schedule having a third group of settings.

Upon setting of the schedule via the application, the mobile device transmits the schedule information to the smart HVAC control module 100, which stores the information in its memory or non-volatile storage, and operates the HVAC appliance according to the schedule by sending signals to the standard IR remote controller or operating its own IR emitter by the means described above. For example, if the schedule stored by an attachable smart module 100 contains instructions to turn on the HVAC appliance at 1 pm with a temperature range of 20° C. to 25° C., the attachable smart module 100 will monitor the room temperature using an internal temperature sensor, and emit coded IR signals using its IR emitter to the HVAC appliance at appropriate times to turn the HVAC appliance on and off (or changes modes) to ensure that the room temperature remains within the range. For integrated smart modules 100, the process is the same, except that the smart module sends instructions via its output port to an electronic component of the standard IR remote controller, instructing the standard IR remote controller to operate the HVAC appliance at appropriate times to turn the HVAC appliance on and off (or changes modes) to ensure that the room temperature remains within the range.

FIG. 9 is a set of screenshots of an application for a mobile device showing automated management of ductless HVAC appliances through smart HVAC control modules. The first screenshot 910 shows an exemplary "comfy mode" setting which automated HVAC management according to certain user-defined preferences and pre-defined programming. The second screenshot 920 shows exemplary user-defined preferences that may be selected for the exemplary "comfy mode" which, when set, will cause the application to automatically manage one or more HVAC appliances through a smart HVAC control module 100 using pre-defined functions and logic. The third screenshot 930 shows selectable times of day at which the exemplary "comfy mode" can be toggled on or off, simplifying management of one or more HVAC appliances.

Upon setting of the automated management configurations via the application, the mobile device transmits the automated management configurations to the smart HVAC control module 100, which stores the information in its memory or non-volatile storage, and operates the HVAC appliance according to the schedule by sending signals to the standard IR remote controller or operating its own IR emitter by the means described above. For example, if the schedule stored by an attachable smart module 100 contains instructions to turn on the HVAC appliance at 1 pm with a temperature range of 20° C. to 25° C., the attachable smart module 100 will monitor the room temperature using an internal temperature sensor, and emit coded IR signals using its IR emitter to the HVAC appliance at appropriate times to turn the HVAC appliance on and off (or changes modes) to ensure that the room temperature remains within the range. For integrated smart modules 100, the process is the same, except that the smart module sends instructions via its output port to an electronic component of the standard IR remote controller, instructing the standard IR remote controller to operate the HVAC appliance at appropriate times to turn the HVAC appliance on and off (or changes modes) to ensure that the room temperature remains within the range.

Figure 10:
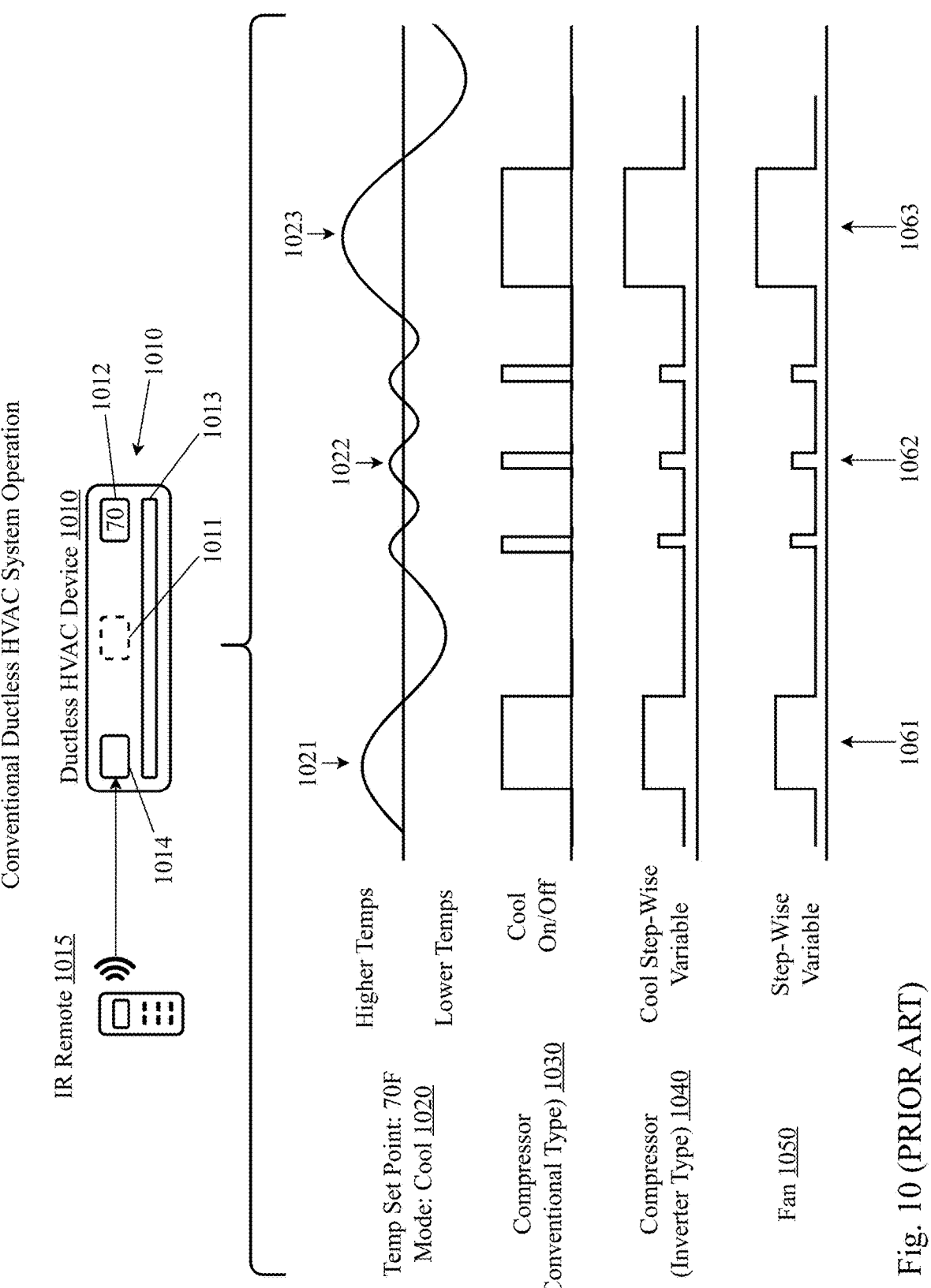
FIG. 10 (PRIOR ART) is a diagram showing the operation of conventional ductless HVAC systems.

FIG. 10 (PRIOR ART) is a diagram showing the operation of conventional ductless HVAC systems. In this example, the ductless HVAC system comprises an infrared (IR) remote controller 1015 and a ductless HVAC device 1010. The HVAC device 1010 typically comprises an internal temperature sensor 1011, a temperature display 1012 reflecting the measurement of the internal temperature sensor 1011, an air vent 1013 distribution of conditioned air into the room, a compressor (not shown), a fan or blower (not shown), and an infrared (IR) receiver 1014 for receipt of IR signals from the IR remote controller 1015. The IR remote controller is used to send infrared signals to change the target temperature of the ductless HVAC device 1010, its mode of operation (e.g., cooling, heating, etc.), and optionally secondary features such as fan speed.

As temperatures increase above the target temperature (e.g., as shown at 1021, 1022, 1023) and decrease below the target temperature, the basic internal programming of the HVAC device is limited to increasing compressor speeds and fan speeds as the room temperature deviates from the target temperature as measured by the internal temperature sensor 1011. There are no advanced functions such as setting of temperature ranges (dead zones), operation based on predicted temperatures, or external control other than via the IR remote controller 1015. In some systems, the IR remote controller 1015 has its own built-in temperature sensor, and can transmit readings from that built-in temperature sensor to the ductless HVAC device 1010. However, this works only if the IR remote controller is properly pointed at the HVAC device 1010 (which is often inconvenient to do) and this feature turns off after a set period of time if the ductless HVAC device 1010 does not receive a reading from the IR remote controller 1015 within a certain period of time (e.g., 10 minutes). Further, even using built-in sensor of the IR remote controller 1015, the operations of the ductless HVAC system remains limited to its basic internal programming without any smart thermostat functionality.

Here, the temperature set point (target temperature) of the ductless HVAC device is set to 70 F and its mode is set to cooling 1020. As the room temperature increases above the target temperature (e.g., as shown at 1021, 1022, and 1023), the basic internal programming of the ductless HVAC system 1010 operates its compressor and/or fan to cool the room back to the target temperature. In the case of ductless HVAC devices 1010 with conventional-type compressors 1030, the compressor can only be turned on or off In the case of ductless HVAC devices 1010 with inverter-type compressors, the speed of compressor operation is variable according to discrete steps (step-wise variable). In most ductless HVAC devices 1010, the fan speed is variable according to discrete steps (step-wise variable). Exemplary responses 1061, 1062, 1063 of the basic internal programming of a ductless HVAC device to exemplary increases in room temperature 1021, 1022, 1023 of a ductless HVAC device are shown. If the room temperature deviation from the target temperature is moderate 1021 the compressor and fan are operated at moderate speeds 1061 (except for the conventional-type compressor which is on/off). If the room temperature deviation from the target temperature is low 1022 the compressor and fan are operated at low speeds 1062 (except for the conventional-type compressor which is on/off). If the room temperature deviation from the target temperature is high 1023 the compressor and fan are operated at high speeds 1063 (except for the conventional-type compressor which is on/off). The set points of these various operations based on a deviation from the target temperature are fixed by the basic internal programming of the ductless HVAC device, which prevents any sort of smart control of the operation of the ductless HVAC device. The temperature is set and the heating or cooling operation is fixed by the basic internal programming.

Other obstacles to smart operation of ductless HVAC devices are presented by the compressor type installed in each HVAC device. A major disadvantage of ductless HVAC devices with conventional-type compressors is that they are either fully on or fully off. This results in a fixed level of cooling or heating based entirely on the current room temperature versus the target temperature. This on/off functionality is inefficient and wastes energy. An improvement over conventional-type compressors is the inverter-type compressor, which has variable speed operation. However, the disadvantage of inverter-type compressors is that they are always on and never fully shut off while the ductless HVAC device is in operation. There is no hybrid type compressor that allows for both variable operation and on/off operation, depending on circumstances.

Figure 11:
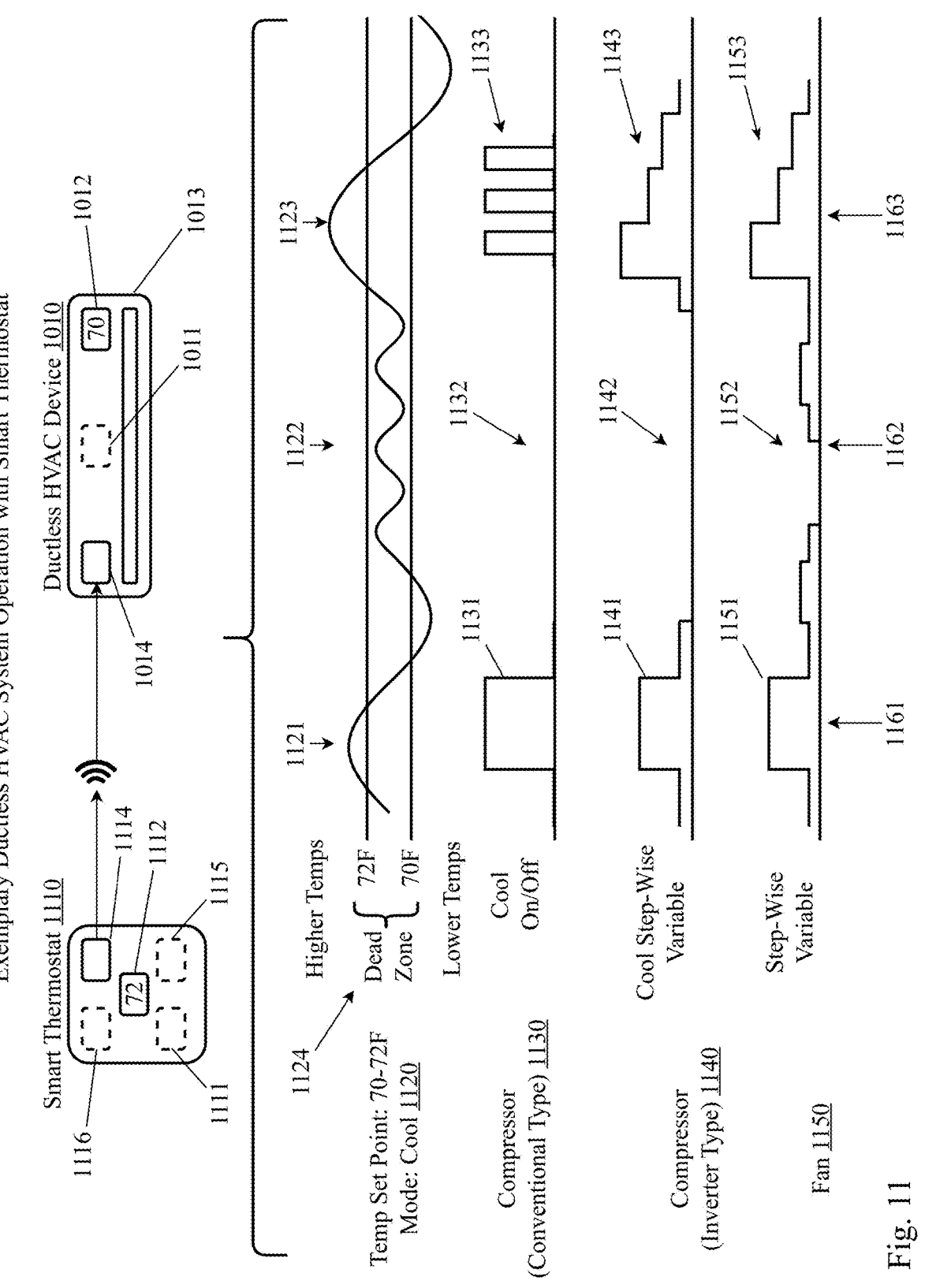
FIG. 11 is a diagram showing exemplary operation of a ductless HVAC device as operated by a smart thermostat as described herein.

FIG. 11 is a diagram showing exemplary operation of a ductless HVAC device as operated by a smart thermostat as described herein. The smart thermostat system and method as herein described overcomes these obstacles by acting as an external controller with algorithms which overrides the standard operation of the HVAC device by setting and re-setting the target temperature of the ductless HVAC device to force it to operate according to settings and algorithms of the smart thermostat which mimic the smart controls available on central HVAC systems. It does this by taking advantage of the basic internal programming which operates the compressor and fan according to pre-set speeds based on levels of deviation of the room temperature from the target temperature by setting the target temperature above or below the intended room temperature to cause the ductless HVAC device to operate as though there is a greater or lesser differential between the target temperature and room temperature than actually exists.

The smart thermostat 1110 of this embodiment comprises an internal temperature sensor 1111, a display 1112 showing the room temperature as measured by the internal temperature sensor 1111, an infrared transmitter for transmitting infrared signals to a ductless HVAC device 1010, a humidity sensor 1115, and a network interface 1116 for connecting to other devices or the Internet. The ductless HVAC device 1010 is a conventional ductless HVAC device 1010 as described above in the previous example.

The smart thermostat 1110 may be programmed with a temperature range (also known as a dead zone), meaning that active room temperature regulation in this range can be reduced or eliminated in order to conserve energy. Setting of a temperature range is a standard feature in central HVAC control systems, but does not exist for ductless HVAC systems because of their more basic design and control features. Not only does this feature not exist for ductless HVAC systems, because the basic internal programming of ductless HVAC systems is fixed, external systems cannot establish a temperature range for a ductless HVAC system without using the methodologies described herein. The smart thermostat described herein establishes a temperature range for itself, and sets and resets the target temperature of the ductless HVAC device to mimic operation of the ductless HVAC device as though it had such a temperature range. Additionally, the smart thermostat exerts indirect control over the compressor speeds and fan speeds through smart setting and resetting of the target temperature.

As the smart thermostat may be placed closer to persons in the room (e.g., on a desk or table near where the person is sitting or on a nearby wall) and does not need to be touched during operation), the smart thermostat overcomes a major disadvantage of IR remote controllers with built-in temperature sensors, in that the IR transmitter on the smart thermostat can always face, and communicate via IR signals with, the ductless HVAC device without being moved and interrupting communications with the ductless HVAC device.

In this example, the smart thermostat 1110 is programmed with a temperature range 1124 (also known as a dead zone) of 70 F to 72 F, meaning that active room temperature regulation in this range can be reduced or eliminated in order to conserve energy, and is set to cool mode 1120. The room temperature is measured not by the internal temperature sensor of the ductless HVAC device 1010, but by the smart thermostat 1110 which is closer to the persons in the room and therefore more accurate, although in this example it will be assumed that the smart thermostat 1110 and ductless HVAC device 1010 read the same temperate to simplify explanation. As the room temperature rises above the upper threshold of the temperature range (72 F), the smart thermostat 1110 sets the target temperature of the ductless HVAC device 1010 to a lower temperature, such as the upper threshold (72 F) or below. Setting the target temperature below the current room temperature causes the ductless HVAC device 1010 to start cooling according to its basic internal programming which, in many models, has stepped cooling functions which depend on the differential between the current room temperature (as measured by its own internal temperature sensor) and the target temperature.

As shown at 1161, for a moderate rise above the upper threshold of the temperature range 1121, the smart thermostat may set a target temperature at the lower threshold (70 F) of the temperature range. Assuming that the ductless HVAC device currently reads 73 F, this will generally result in moderate compressor speed settings 1141 and fan speed settings 1151 from the basic internal programming of the ductless HVAC device 1010 (or on/off compressor settings 1131 in the case of conventional-type compressors) as the difference in temperature between the room temperature (73 F) and target temperature (70 F) is only a moderate 3 F. Many variations are possible, such as increasing the target temperature as the room cools to within the dead zone 1124 to slow the rate of cooling as shown by the lower compressor speed settings 1141 and fan speed settings 1151 as the room temperature enters the dead zone 1124.

As shown at 1162, where the temperature 1122 is in the dead zone 1124 (as measured by the smart thermostat 1110), the smart thermostat 1110 can manipulate the target temperature of the ductless HVAC device 1010 to operate the compressor either at low settings or turn the inverter-type compressor off completely 1142 by powering off the ductless HVAC unit. Conventional-type compressors can be turned off 1132 while the room temperature is in the dead zone 1124. Turning off of inverter-type compressors is not possible on conventional ductless HVAC devices with inverter-type ductless HVAC devices. Compressors and fans can also be run at low speeds or shut off entirely 1132, 1142, 1152 by manipulation of the target temperature by the smart thermostat 1110. For example, as the room temperature reaches 70 F, the smart thermostat 1110 can set the target temperature on the ductless HVAC device to 70 F, keeping cooling operating at minimum settings, or can set the target temperature to 72 F to shut off cooling entirely. For inverter-type compressors which are always on at some minimum level, the smart thermostat 1110 can turn of the ductless HVAC device entirely and power it back on when cooling is again needed. These manipulations of a ductless HVAC device to mimic a dead zone can reduce compressor and fan speeds and on/off periods to increase energy efficiency.

As shown at 1163, for a large rise above the upper threshold of the temperature range 1123, the smart thermostat may set a target temperature below the lower threshold (70 F) of the temperature range, for example at 68 F. Assuming that the ductless HVAC device currently reads 75 F, this will generally result in high compressor speed settings 1141 and fan speed settings 1151 from the basic internal programming of the ductless HVAC device 1010 (or on/off compressor settings 1131 in the case of conventional-type compressors) as the as the difference in temperature between the room temperature (75 F) and target temperature (68 F) is a substantial 7 F. Many variations are possible, such as increasing the target temperature as the room cools to a step-wise reduction in compressor speeds 1143 and fan speeds 1153 as the room temperature approaches and enters the dead zone 1124. For conventional-type compressors, target temperatures may be used which cause periodic operation of the compressor 1133.

Figure 12:
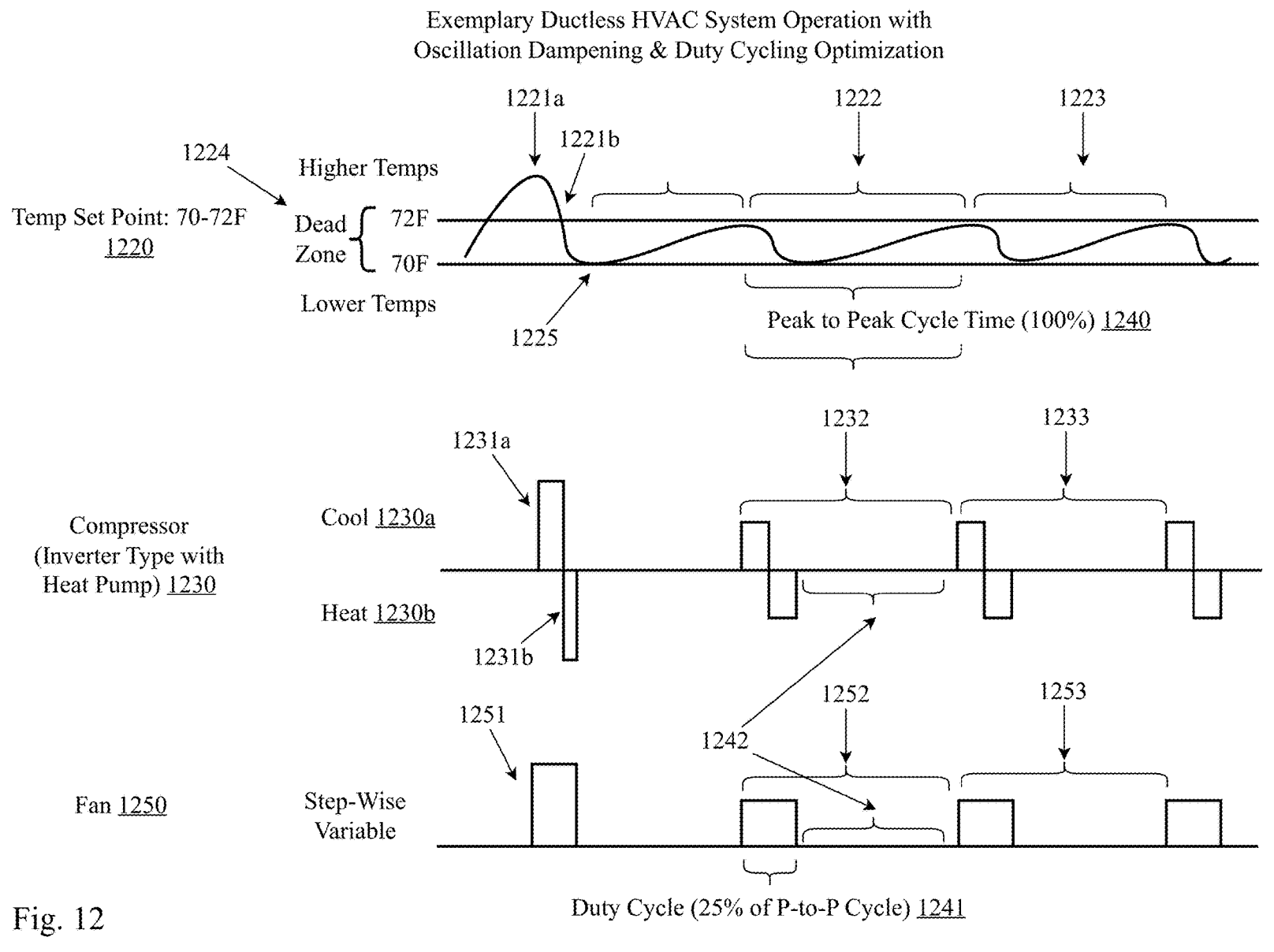

FIG. 12 is a diagram showing exemplary operation of a ductless HVAC device as operated by a smart thermostat as described herein with oscillation damping and duty cycle optimization. Here, the smart thermostat 1110 uses a sequence of target temperature manipulations to damp room temperature oscillation and reduce the duty cycle of the compressor and fan of a ductless HVAC device 1010.

In this example, the smart thermostat 1110 is programmed with a temperature range 1224 (also known as a dead zone) of 70 F to 72 F, meaning that active room temperature regulation in this range can be reduced or eliminated in order to conserve energy, and is set to cool mode 1220. The room temperature is measured not by the internal temperature sensor of the ductless HVAC device 1010, but by the smart thermostat 1110 which is closer to the persons in the room and therefore more accurate, although in this example it will be assumed that the smart thermostat 1110 and ductless HVAC device 1010 read the same temperate to simplify explanation. As the room temperature rises above the upper threshold of the temperature range (72 F), the smart thermostat 1110 sets the target temperature of the ductless HVAC device 1010 to a lower temperature, such as the upper threshold (72 F) or below. Setting the target temperature below the current room temperature causes the ductless HVAC device 1010 to start cooling according to its basic internal programming which, in many models, has stepped cooling functions which depend on the differential between the current room temperature (as measured by its own internal temperature sensor) and the target temperature.

If the room temperature is well above the upper threshold of the temperature range 1221a, for example at 75 F, the smart thermostat may set a target temperature below the lower threshold (70 F) of the temperature range, for example at 68 F. In this example, it is assumed that the ductless HVAC device is equipped with an inverter-type compressor and a heat pump 1230, thus allowing the ductless HVAC device to both cool 1230a and heat 1230b the room. Assuming that the ductless HVAC device currently reads 75 F, this will generally result in high compressor speed settings 1231a and fan speed settings 1251a from the basic internal programming of the ductless HVAC device 1010 as the as the difference in temperature between the room temperature (75 F) and target temperature (68 F) is a substantial 7 F. This forced high cooling will accelerate the downward rate of change of room temperature 1221b, which can be measured by smart thermostat 1110. As the room temperature approaches the lower bound of the dead zone (70 F), rather than allow the room temperature to oscillate below the lower threshold (70 F), the smart thermostat will raise the target temperature substantially (e.g., to 75 F) to force the ductless HVAC device in to high heating mode with high compressor speeds 1231b and high fan speeds 1251a but with a reversed heat pump valve for a certain period of time to slow cooling and damp the oscillation of the room temperature so that it does not fall below the lower threshold of the dead zone 1225. The high heating phase will typically be operated for a shorter period of time than the cooling phase, as the goal is to damp the rate of cooling, and not to raise the room temperature.

Once the temperature has been quickly reduced to within the dead zone 1224, subsequent cooling and heating phases may be performed 1222, 1223 similarly, but with either shorter cooling/heating phases at the same compressor speeds fan speeds or with cooling/heating phases for similar periods of time with reduced compressor speeds 1232, 1233 and fan speeds 1252, 1253 (as shown here).

Another benefit to accelerated cooling and damping as described above is that the duty cycle of both the compressor and fan can be reduced, making the operation of the ductless HVAC device more energy efficient, or reducing wear, or both. Here, after the room temperature has fallen into the dead zone, a regular cooling/heating cycle of the room temperature can be observed 1240 the peak-to-peak cycle of cooling and heating is shown at 1240 which represents 100% of the cycle time. The duty cycle is the portion of the total cycle time 1240 during which the compressor and fan are running 1241. Here, it is assumed that the compressor and fan are both on for the same period of time, and that their duty cycles are identical, but it would be possible to calculate different duty cycles for the compressor and fan if they operate for different periods of time. Here, the duty cycle 1241 is 25%, shown as 25% of the total cycle time 1240 with the remaining 75% of the cycle time 1242 being portion of the total cycle time 1240 during which the compressor and fan are both off. The duty cycle can be changed by changing algorithms or settings of the smart thermostat.

Figure 13:
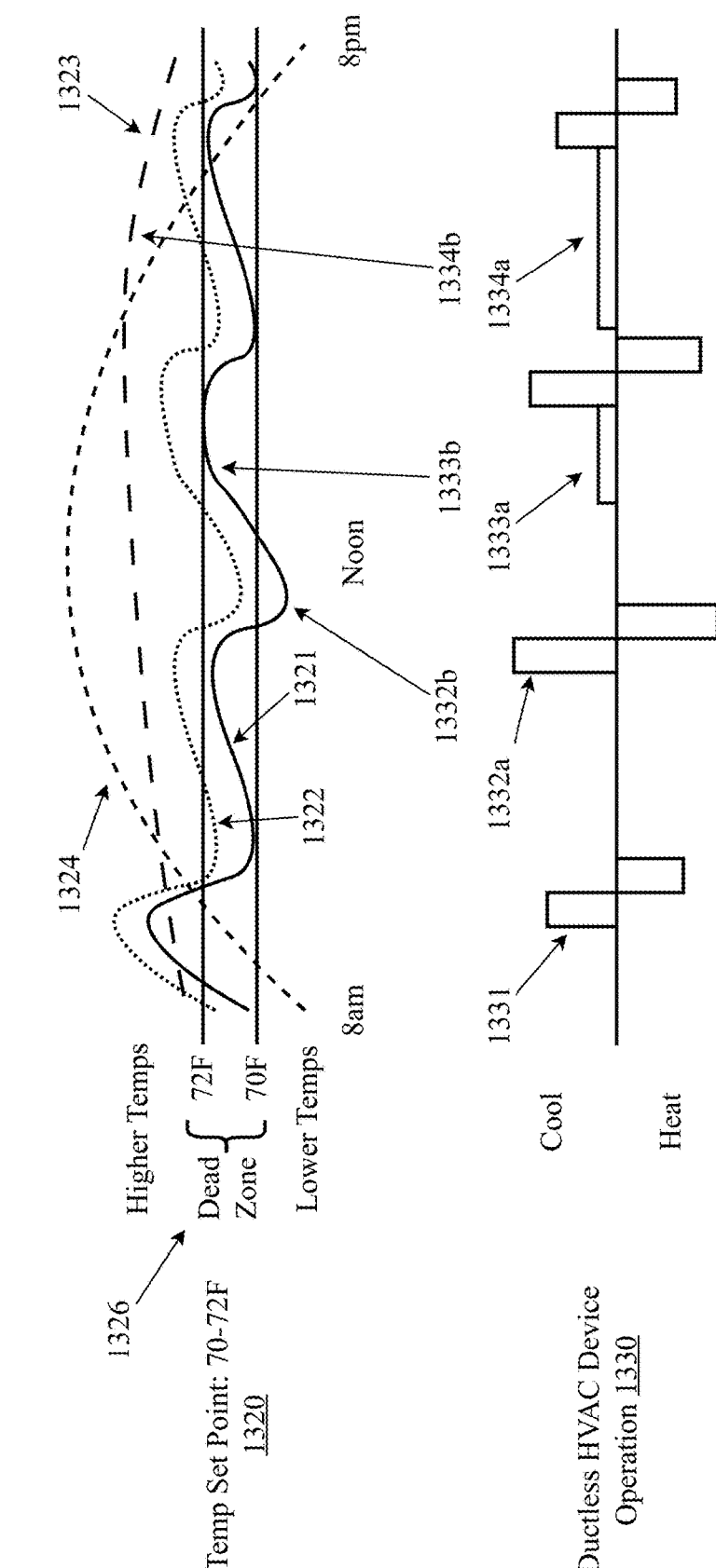
FIG. 13 is a diagram showing exemplary operation of a ductless HVAC device as operated by a smart thermostat as described herein with a multiple-input optimization algorithm.

FIG. 13 is a diagram showing exemplary operation of a ductless HVAC device as operated by a smart thermostat as described herein with a multiple-input optimization algorithm. Previous diagrams have shown exemplary operation of a ductless HVAC device by a smart thermostat with a single variable, room temperature, influencing the decisions of the smart thermostat. However, algorithms using multiple variables to calculate and/or predict room temperatures and set target temperatures can be used. The data for these variables can come from various sources, either within the smart thermostat or external to the smart thermostat. A non-limiting list of such sources of variables is shown and described in FIG. 1 of U.S. patent application Ser. No. 18/193,576 which has been incorporated herein by reference, and includes variables from such sources as weather conditions, room temperatures, temperature set-points, applying a certain preset on smart devices and other settings, power settings including but not limited to a device's on/off status and a current operating power level of a device, OpenADR™ triggers, and changes in smart thermostat presets and other settings due to; motion detection, geofence changes, change in daylight savings time (DST) of any device, any predefined action from virtual assistants such as Alexa™ and Siri™, Google Home™, Smartthings™, IFTTT™, daily/weekly/monthly usage reaching a certain level, vacation settings, hold settings, and modes which are pre-configured or selectable groups of activation conditions programmed for a particular purpose. Smart thermostat 1110 may access internal sensors directly and may access variables from external sources via its network interface 1160.

In this example, data for four variables is tracked by the smart thermostat 1110, any combination of which may be used to calculate and/or predict room temperatures. Here, the smart sensor has an internal sensor for the indoor temperature of the room (shown as solid line 1321), an internal sensor for the humidity of the room (shown as long-dashed line 1323), has access via the Internet to an outdoor temperature (shown as a short-dashed line 1324), and a calculated temperature of the temperature sensor for the ductless HVAC device (shown as dotted line 1322, representing a calculated temperature differential between the measured temperature at the smart thermostat and the measured temperature at the ductless HVAC device). Exem-plary data for these four exemplary variables is shown from 8 am to 8 pm on a given day.

Rather than simply using a single variable, combinations of variables may be used to perform anticipatory or predictive heating and cooling of the room. For example, knowing that the temperature will rise during the day and will be highest at noon, cooling may be lower in the mornings 1331, 1351 and higher before the noon peak 1332a, 1352a forcing the temperature below the lower threshold of the dead zone 1320 to avoid a spike in room temperature at noon. A known daily anomaly in room temperature 1333b may be offset by running the ductless HVAC device 1330 at low cooling to avoid having the room temperature exceed the upper threshold of the dead zone 1320. Likewise, a known or measured increase in humidity 1334b may be offset by running the ductless HVAC device 1330 at low cooling to keep the peak-to-peak cycle of room temperatures within the dead zone 1320 consistent (inconsistent temperature fluctuations tends to decrease energy efficiency).

Prediction of room temperatures may be accomplished by a variety of algorithms. In some embodiments, machine learning algorithms may be used to predict room temperatures using data from any or all of the various sources listed above.

FIG. 14 is a flow diagram an exemplary algorithm for damping oscillation and reducing the duty cycle of a ductless HVAC device by setting and re-setting of the target temperature of the HVAC device based on rate of room temperature change. At step 1401 (Stage 1), the ductless HVAC device target temperature is set below the lower dead zone threshold to force HVAC device to cool faster than it would if allowed to cool according to its own internal sensor and programming, and the rate of change of room temperature drop at smart thermostat temperature sensor is checked. At step 1402 (Stage 2), if the rate of change of temperature drop is not sufficient, the target temperature of the ductless HVAC device is lowered further, forcing the HVAC unit to engage greater cooling power and greater fan operation. The rate of change of temperature drop at smart thermostat temperature sensor is checked again. At step 1403 (Stage 3), if the rate of change of room temperature drop is still not sufficient, the target temperature of the HVAC device is lowered still further, forcing the HVAC unit to engage its maximum cooling power and maximum fan operation. The rate of change of temperature drop at smart thermostat temperature sensor is monitored. At step 1404 (Stage 4), once the room temperature as measured at the smart thermostat reaches (or approaches at a certain velocity), the target temperature of the ductless HVAC device is set above the upper dead zone threshold, to force the HVAC unit into heating mode to slow down the rate of change of the temperature drop in the room and to prevent oscillation of the room temperature below the lower dead zone threshold. The rate of change of temperature drop at smart thermostat temperature sensor is monitored. At step 1405 (Stage 5), when the rate of change of the temperature drop approaches zero, the target temperature of the HVAC device is set at the current temperature measured by the smart thermostat to stabilize the room temperature at the current temperature measured by the smart thermostat. Note that the above target temperature settings may include an offset to account for a differential in temperature readings by the ductless HVAC device and the smart thermostat. Further, while temperatures in this example are set above and below the dead zone thresholds, this is not intended to be limiting, and temperatures may be set at or within those thresholds.

Figure 15:
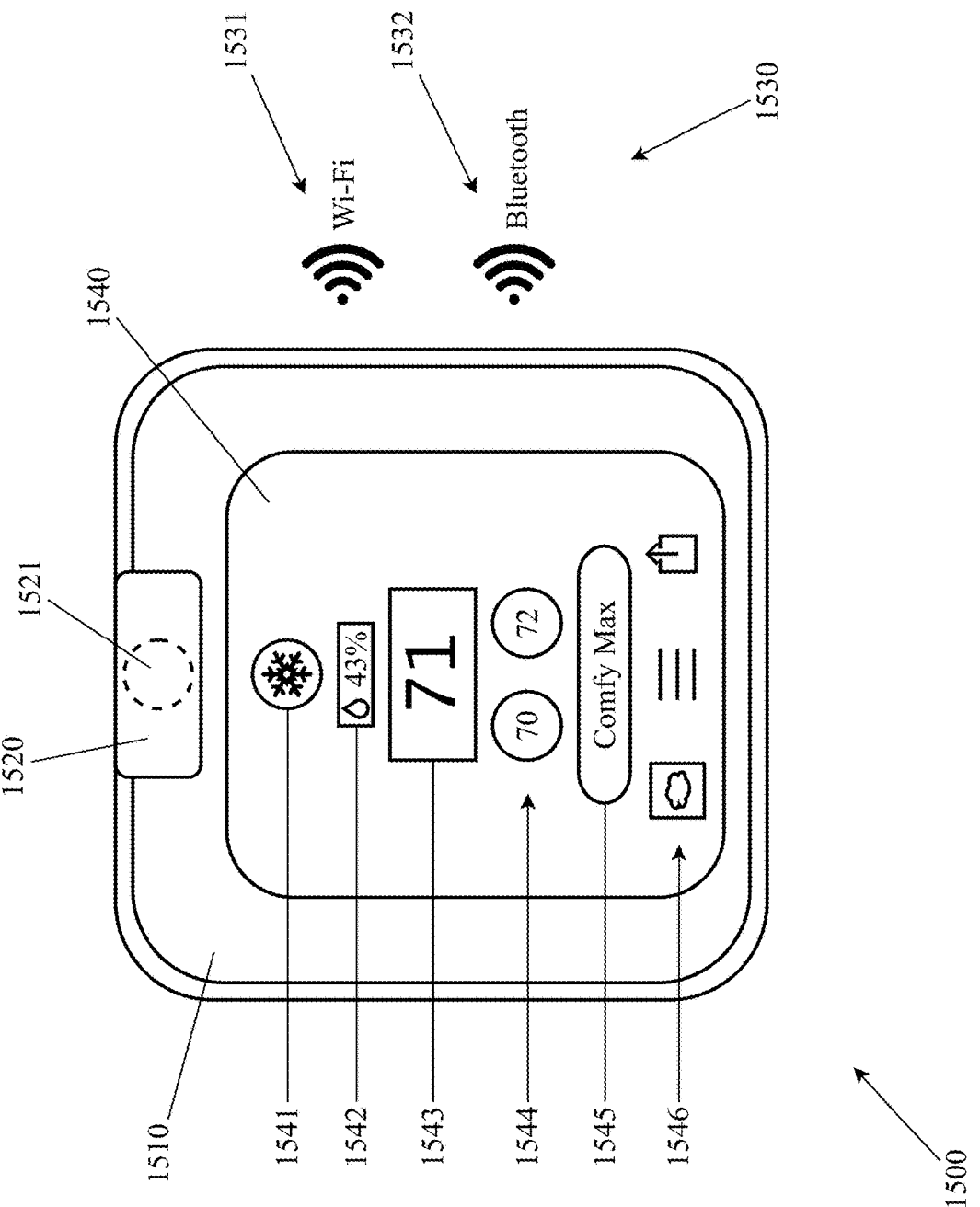
FIG. 15 is a diagram of an exemplary external view of a smart thermostat.

FIG. 15 is a diagram of an exemplary external view of a smart thermostat. This exemplary smart thermostat 1500 may be used in embodiments described herein.

The smart thermostat system and method as herein described acts as an external controller with algorithms which overrides the standard operation of a ductless HVAC device by setting and re-setting the target temperature of the ductless HVAC device to force it to operate according to settings and algorithms of the smart thermostat which mimic the smart controls available on central HVAC systems. It does this by taking advantage of the basic internal programming which operates the compressor and fan according to pre-set speeds based on levels of deviation of the room temperature from the target temperature by setting the target temperature above or below the intended room temperature to cause the ductless HVAC device to operate as though there is a greater or lesser differential between the target temperature and room temperature than actually exists.

The smart thermostat 1500 of this embodiment comprises an external shell or case 1510, an infrared-transparent window 1520 for an infrared transmitter 1521, internal temperature sensor (not shown), a network interface (not shown) for connecting to other devices or the Internet, a display 1540 for display of information and for interaction by a user with the smart thermostat 1500, a humidity sensor (not shown). This example assumes that the smart thermostat 1500 will be used to control a conventional ductless HVAC device 1010 as described above in previous examples.

The external shell or case 1510 houses the electronic circuitry and other components of the smart thermostat 1500. The external shell or case 1510 may either be mounted on a wall, or placed on a horizontal surface such as a desk or table using a suitable stand.

The infrared-transparent window 1520 provides a means for an infrared transmitter 1521 inside the external shell or case 1510 to transmit infrared signals to an infrared-controllable device such as a ductless HVAC device.

The internal temperature sensor (not shown) may be used to monitor and display the room temperature at the location of the smart thermostat 1500 as indicated by the current temperature display 1543 showing a temperature of 71 F.

The network interface (not shown) may be used for connecting to other devices or the Internet. More than one network interface may be available. For example, one network interface may be a Wi-Fi™ network interface for use in connecting to the Internet via a router or other network, and another network interface may be a Bluetooth™ interface for short-range communications with a mobile phone. While many variations are possible, in this example network interface(s) are configured to transmit and receive Wi-Fi™ signals 1531 for connection to the Internet and Bluetooth™ signals 1532 for connections to a mobile computing device (e.g., a smartphone).

In an exemplary use case, a smartphone may be used to connect to the smart thermostat 1500 via Bluetooth™ to set up the smart thermostat 1500 via an application on the smartphone. The application may contain default settings for transmission to the smart thermostat 1500 and may allow the user to change or adjust the settings for the smart thermostat 1500. The application may receive the smart thermostat's 1500 serial number, media access control (MAC) address, or other identification and transmit that information to a cloud-based server or system to register the smart thermostat 1500 with the cloud-based server or system. The application may further transmit wireless connection instructions (e.g., an S SID and password for a local wireless router) to the smart thermostat 1500 for the smart thermostat to connect to the Internet via Wi-Fi through an available network (e.g., the local wireless router mentioned above). The application may further have access to the cloud-based server or system for controlling of the smart thermostate 1500 remotely. As the smart thermostat 1500 is connected to the Internet and is controllable remotely via the cloud-based server or system, the smart thermostat can be controlled from anywhere in the world using the application on the smartphone.

The display 1540 for display of information and for interaction by a user with the smart thermostat 1500 comprises, in this example, a heating/cooling indicator 1541 for showing the current heating or cooling status of the ductless HVAC unit 1010, a humidity indicator 1542 showing the current humidity of the room as indicated by the internal humidity sensor (not shown), a current temperature indicator 1543 showing the current room temperature as indicated by the internal temperature sensor (not shown) of the smart thermostat 1500, a temperature range indicator 1544 showing the lower and upper thresholds of the temperature range 1544, a mode indicator 1545 showing which mode of operation has been selected for the smart thermostat (in this case a "Comfy Max" mode has been selected for keeping the room temperature within the temperature range 1544 according to one or more of the algorithms described herein), and other indicators 1546 for things like outside weather, additional settings, and connectivity features.

The smart thermostat 1500 may be programmed with a temperature range 1544 (also known as a dead zone), meaning that active room temperature regulation in this range can be reduced or eliminated in order to conserve energy. Setting of a temperature range is a standard feature in central HVAC control systems, but does not exist for ductless HVAC systems because of their more basic design and control features. Not only does this feature not exist for ductless HVAC systems, because the basic internal programming of ductless HVAC systems is fixed, external systems cannot establish a temperature range for a ductless HVAC system without using the methodologies described herein. The smart thermostat described herein establishes a temperature range for itself, and sets and resets the target temperature of the ductless HVAC device to mimic operation of the ductless HVAC device as though it had such a temperature range. Additionally, the smart thermostat exerts indirect control over the compressor speeds and fan speeds through smart setting and resetting of the target temperature.

As the smart thermostat may be placed closer to persons in the room (e.g., on a desk or table near where the person is sitting or on a nearby wall) and does not need to be touched during operation), the smart thermostat overcomes a major disadvantage of IR remote controllers with built-in temperature sensors, in that the IR transmitter on the smart thermostat can always face, and communicate via IR signals with, the ductless HVAC device without being moved and interrupting communications with the ductless HVAC device.

In this example, the smart thermostat 1500 is programmed with a temperature range 1544 (also known as a dead zone) of 70 F to 72 F, meaning that active room temperature regulation in this range can be reduced or eliminated in order to conserve energy, and is set to comfy max mode 1545. The room temperature is measured not by the internal temperature sensor of the ductless HVAC device 1010, but by the smart thermostat 1500 which is closer to the persons in the room and therefore more accurate, although in this example it will be assumed that the smart thermostat 1500 and ductless HVAC device 1010 read the same temperate to simplify explanation. As the room temperature rises above the upper threshold of the temperature range (72 F), the smart thermostat 1500 sets the target temperature of the ductless HVAC device 1010 to a lower temperature, such as the upper threshold (72 F) or below. Setting the target temperature below the current room temperature causes the ductless HVAC device 1010 to start cooling according to its basic internal programming which, in many models, has stepped cooling functions which depend on the differential between the current room temperature (as measured by its own internal temperature sensor) and the target temperature.

As shown in previous examples, for a moderate rise above the upper threshold of the temperature range 1544, the smart thermostat may set a target temperature at the lower threshold (70 F) of the temperature range. Assuming that the ductless HVAC device currently reads 73 F, this will generally result in moderate compressor speed settings and fan speed settings from the basic internal programming of the ductless HVAC device 1010 (or on/off compressor settings in the case of conventional-type compressors) as the difference in temperature between the room temperature (73 F) and target temperature (70 F) is only a moderate 3 F. Many variations are possible, such as increasing the target temperature as the room cools to within the dead zone 1544 to slow the rate of cooling as shown by the lower compressor speed settings and fan speed settings as the room temperature enters the dead zone 1544.

As shown in previous examples, where the temperature 1543 is in the dead zone 1544 (as measured by the smart thermostat 1500), the smart thermostat 1500 can manipulate the target temperature of the ductless HVAC device 1010 to operate the compressor either at low settings or turn the inverter-type compressor off completely by powering off the ductless HVAC unit. Conventional-type compressors can be turned off while the room temperature is in the dead zone 1544. Turning off of inverter-type compressors is not possible on conventional ductless HVAC devices with inverter-type ductless HVAC devices. Compressors and fans can also be run at low speeds or shut off entirely by manipulation of the target temperature by the smart thermostat 1500. For example, as the room temperature reaches 70 F, the smart thermostat 1500 can set the target temperature on the ductless HVAC device to 70 F, keeping cooling operating at minimum settings, or can set the target temperature to 72 F to shut off cooling entirely. For inverter-type compressors which are always on at some minimum level, the smart thermostat 1500 can turn of the ductless HVAC device entirely and power it back on when cooling is again needed. These manipulations of a ductless HVAC device to mimic a dead zone can reduce compressor and fan speeds and on/off periods to increase energy efficiency.

As shown in previous examples, for a large rise above the upper threshold of the temperature range 1123, the smart thermostat may set a target temperature below the lower threshold (70 F) of the temperature range, for example at 68 F. Assuming that the ductless HVAC device currently reads 75 F, this will generally result in high compressor speed settings and fan speed settings from the basic internal programming of the ductless HVAC device 1010 (or on/off compressor settings in the case of conventional-type compressors) as the as the difference in temperature between the room temperature (75 F) and target temperature (68 F) is a substantial 7 F. Many variations are possible, such as increasing the target temperature as the room cools to a step-wise reduction in compressor speeds and fan speeds as the room temperature approaches and enters the dead zone

1544. For conventional-type compressors, target temperatures may be used which cause periodic operation of the compressor.

Exemplary Computing Environment

Figure 16:
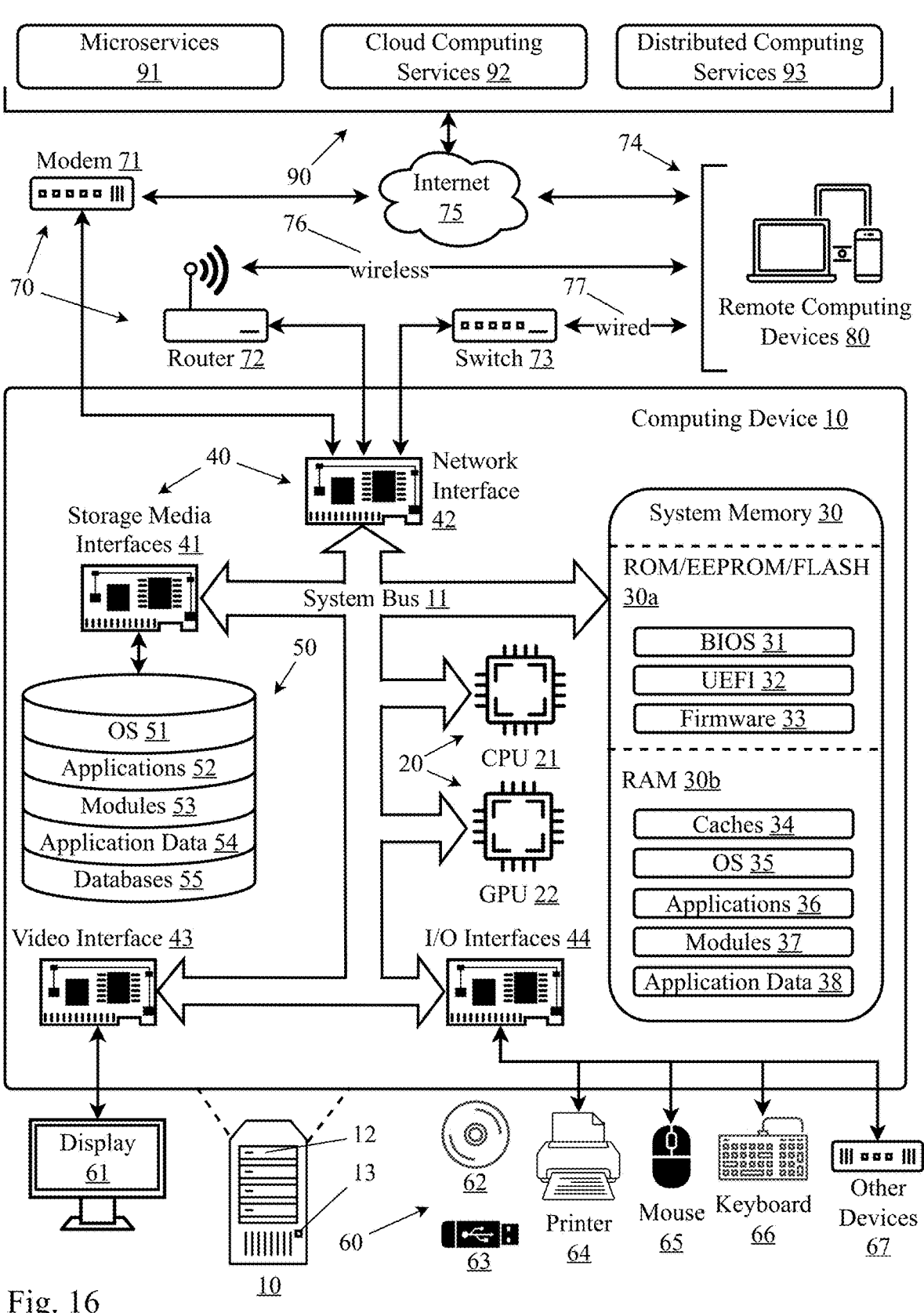
FIG. 16 illustrates an exemplary computing environment on which an embodiment described herein may be implemented.

FIG. 16 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A smart thermostat for operation and control of a ductless heating, ventilation, and air conditioning (HVAC) device, the smart thermostat comprising a memory, a processor, a temperature sensor, an infrared emitter, and a first plurality of programming instructions stored in the memory which, when operating on the processor, causes the smart thermostat to:

monitor, using the temperature sensor, a room temperature of a room in which the smart thermostat is located;

when the room temperature rises above an upper threshold temperature of a temperature range, emit a first infrared control signal from the infrared emitter, the first infrared control signal comprising instructions for the ductless HVAC device to lower its target temperature to a first target temperature value; and when the room temperature falls below a lower threshold temperature of the temperature range, emit a second infrared control signal from the infrared emitter, the second infrared control signal comprising instructions for the ductless HVAC device to raise its target temperature to a second target temperature value.

2. The smart thermostat of claim 1, wherein the smart thermostat is further programmed to:

after emission of the first infrared control signal:

determine a first rate of change in the room temperature in response to the emission; and when the first rate of change indicates that the room temperature is decreasing, but below a first rate of change threshold, emit a third infrared control signal from the infrared emitter, the third infrared control signal comprising instructions for the ductless HVAC device to lower its target temperature further to a third target temperature value; and after emission of the second infrared control signal:

determine the first rate of change in the room temperature in response to the emission; and when the first rate of change indicates that the room temperature is increasing, but below a second rate of change threshold, emit a fourth infrared control signal from the infrared emitter, the fourth infrared control signal comprising instructions for the ductless HVAC device to raise its target temperature further to a fourth target temperature value.

3. The smart thermostat of claim 2, wherein the smart thermostat is further programmed to:

after emission of the third infrared control signal:

determine a second rate of change in the room temperature in response to the emission; and when the second rate of change indicates that the room temperature is decreasing, but below a second rate of change threshold, emit a fifth infrared control signal from the infrared emitter, the fifth infrared control signal comprising instructions for the ductless HVAC device to lower its target temperature further to a fifth target temperature value; and after emission of the fourth infrared control signal:

determine the second rate of change in the room temperature in response to the emission; and when the second rate of change indicates that the room temperature is increasing, but below the second rate of change threshold, emit a sixth infrared control signal from the infrared emitter, the sixth infrared control signal comprising instructions for the ductless HVAC device to raise its target temperature to a sixth target temperature value.

4. The smart thermostat of claim 1, wherein the smart thermostat is further programmed to:

after emission of the first infrared control signal:

determine a third rate of change in the room temperature in response to the emission; and when the room temperature approaches the lower threshold temperature of the temperature range, emit a seventh infrared control signal from the infrared emitter, the seventh infrared control signal comprising instructions for the ductless HVAC device to raise its target temperature to a seventh target temperature value to slow the third rate of change in the room temperature to a fourth rate of change; and after emission of the second infrared control signal:

determine the third rate of change in the room temperature in response to the emission; and when the room temperature approaches the upper threshold temperature of the temperature range, emit an eighth infrared control signal from the infrared emitter, the eighth infrared control signal comprising instructions for the ductless HVAC device to lower its target temperature to an eighth target temperature value to slow the third rate of change in the room temperature to the fourth rate of change.

5. The smart thermostat of claim 4, wherein the smart thermostat is further programmed to:

based on first target temperature value, the seventh target temperature value, the third rate of change, and the fourth rate of change, calculate subsequent target temperatures to force the ductless HVAC device to operate at a pre-defined duty cycle when cooling the room temperature.

6. The smart thermostat of claim 4, wherein the smart thermostat is further programmed to:

based on second target temperature value, the eighth target temperature value, the third rate of change, and the fourth rate of change, calculate subsequent target temperatures to force the ductless HVAC device to operate at a pre-defined duty cycle when heating the room temperature.

7. The smart thermostat of claim 1, wherein the smart thermostat is further programmed to:

after emission of either the first infrared control signal or the second infrared control signal, determine a change in the room temperature in response to the emission, and calculate a differential between the room temperature as indicated by the temperature sensor and a second temperature sensor of the ductless HVAC device.

8. The smart thermostat of claim 7, wherein the smart thermostat is further programmed to:

apply the differential between the room temperature as indicated by the temperature sensor and a second temperature sensor of the ductless HVAC device when making further changes to the target temperature.

9. A method for operation and control of a ductless heating, ventilation, and air conditioning (HVAC) device by a smart thermostat, comprising:

using a smart thermostat comprising a memory, a processor, a temperature sensor, an infrared emitter, and a first plurality of programming instructions to:

monitor, using the temperature sensor, a room temperature of a room in which the smart thermostat is located;

based on the room temperature rising above an upper threshold temperature of a temperature range, emit a first infrared control signal from the infrared emitter, the first infrared control signal comprising instructions for the ductless HVAC device to lower its target temperature to a first target temperature value; and based on the room temperature falling below a lower threshold temperature of the temperature range, emit a second infrared control signal from the infrared emitter, the second infrared control signal comprising instructions for the ductless HVAC device to raise its target temperature to a second target temperature value.

10. The method of claim 9, further comprising using the smart thermostat to:

after emission of the first infrared control signal:

determine a first rate of change in the room temperature in response to the emission; and based on the first rate of change indicating that the room temperature is decreasing, but below a first rate of change threshold, emit a third infrared control signal from the infrared emitter, the third infrared control signal comprising instructions for the ductless HVAC device to lower its target temperature further to a third target temperature value; and after emission of the second infrared control signal:

determine the first rate of change in the room temperature in response to the emission; and based on the first rate of change indicating that the room temperature is increasing, but below a second rate of change threshold, emit a fourth infrared control signal from the infrared emitter, the fourth infrared control signal comprising instructions for the ductless HVAC device to raise its target temperature further to a fourth target temperature value.

11. The method of claim 10, further comprising of using the smart thermostat to:

after emission of the third infrared control signal:

determine a second rate of change in the room temperature in response to the emission; and based on the second rate of change indicating that the room temperature is decreasing, but below a second rate of change threshold, emit a fifth infrared control signal from the infrared emitter, the fifth infrared control signal comprising instructions for the ductless HVAC device to lower its target temperature further to a fifth target temperature value; and after emission of the fourth infrared control signal:

determine the second rate of change in the room temperature in response to the emission; and based on the second rate of change indicating that the room temperature is increasing, but below the second rate of change threshold, emit a sixth infrared control signal from the infrared emitter, the sixth infrared control signal comprising instructions for the ductless HVAC device to raise its target temperature to a sixth target temperature value.

12. The method of claim 9, further comprising using the smart thermostat to:

after emission of the first infrared control signal:

determine a third rate of change in the room temperature in response to the emission; and based on the room temperature approaching the lower threshold temperature of the temperature range, emit a seventh infrared control signal from the infrared emitter, the seventh infrared control signal comprising instructions for the ductless HVAC device to raise its target temperature to a seventh target temperature value to slow the third rate of change in the room temperature to a fourth rate of change; and after emission of the second infrared control signal:

determine the third rate of change in the room temperature in response to the emission; and based on the room temperature approaching the upper threshold temperature of the temperature range, emit an eighth infrared control signal from the infrared emitter, the eighth infrared control signal comprising instructions for the ductless HVAC device to lower its target temperature to an eighth target temperature value to slow the third rate of change in the room temperature to the fourth rate of change.

13. The method of claim 12, further comprising using the smart thermostat to:

based on the first target temperature value, the seventh target temperature value, the third rate of change, and the fourth rate of change, calculate subsequent target temperatures to force the ductless HVAC device to operate at a pre-defined duty cycle as the ductless HVAC device cools the room temperature.

14. The method of claim 12, further comprising using the smart thermostat to:

based on the second target temperature value, the eighth target temperature value, the third rate of change, and the fourth rate of change, calculate subsequent target temperatures to force the ductless HVAC device to operate at a pre-defined duty cycle the ductless HVAC device heats the room temperature.

15. The method of claim 9, further comprising using the smart thermostat to:

after emission of either the first infrared control signal or the second infrared control signal, determine a change in the room temperature in response to the emission, and calculate a differential between the room temperature as indicated by the temperature sensor and a second temperature sensor of the ductless HVAC device.

16. The method of claim 15, further comprising using the smart thermostat to:

apply the differential between the room temperature as indicated by the temperature sensor and a second temperature sensor of the ductless HVAC device based on further changes to the target temperature being made.

\* \* \* \* \*